US012528060B2

(12) United States Patent
Ghaani et al.

(10) Patent No.: US 12,528,060 B2
(45) Date of Patent: *Jan. 20, 2026

(54) SYSTEM AND METHOD FOR THE TREATMENT OF BIOGAS AND WASTEWATER

(71) Applicant: University College Dublin, National University of Ireland, Dublin, Dublin (IE)

(72) Inventors: Mohammad Reza Ghaani, Dublin (IE); Niall Joseph English, Dublin (IE)

(73) Assignee: UNIVERSITY COLLEGE DUBLIN, NATIONAL UNIVERSITY OF IRELAND, DUBLIN, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 18/421,092

(22) Filed: Jan. 24, 2024

(65) Prior Publication Data

US 2024/0157312 A1   May 16, 2024

Related U.S. Application Data

(63) Continuation of application No. 17/285,245, filed as application No. PCT/EP2019/078017 on Oct. 15, 2019, now Pat. No. 11,998,882.

(30) Foreign Application Priority Data

Oct. 15, 2018 (GB) ..................... 1816766

(51) Int. Cl.
*B01F 33/05* (2022.01)
*B01D 53/14* (2006.01)
(Continued)

(52) U.S. Cl.
CPC ........ *B01F 33/051* (2022.01); *B01D 53/1475* (2013.01); *B01D 53/323* (2013.01);
(Continued)

(58) Field of Classification Search
None
See application file for complete search history.

(56) References Cited

U.S. PATENT DOCUMENTS 4,085,170 A   4/1978 Simpson et al.
4,722,787 A   2/1988 Fombarlet et al.
(Continued)

FOREIGN PATENT DOCUMENTS

EP   2446956 A1   5/2012
JP   2010101561 A   5/2010
(Continued)

OTHER PUBLICATIONS

Castellani Beatrice et al: "Carbon and energy footprint of the hydrate-based biogas upgrading process integrated with CO2valorization", Science of the Total Environment, vol. 615, Oct. 5, 2017 (Oct. 5, 2017), pp. 404-411, XP085282071, ISSN: 0048-9697, DOI: 10.1016/J.SCITOTENV.2017.09.254 abstract, p. 405-p. 406 figure 1.

*Primary Examiner* — Duane Smith
(74) *Attorney, Agent, or Firm* — Tarolli, Sundheim, Covell & Tummino LLP

(57) ABSTRACT

The present disclosure relates to a system and method for treating wastewater, the method comprising the steps of: providing a vessel for receiving wastewater and a gas, wherein the gas comprises one or more constituent gas components; directing the wastewater and a first gas component of the gas to the vessel; reducing the temperature of the contents of the vessel from a first temperature to a second temperature to facilitate the formation of clathrate hydrates (Continued)

comprising the wastewater and the first gas component; increasing the temperature of the contents of the vessel with respect to the second temperature to facilitate melting of the clathrate hydrates; and removing clean water and/or the first gas component from the vessel.

(2013.01); *C02F 3/28* (2013.01); *B01D 2257/504* (2013.01); *B01D 2258/05* (2013.01); *B01D 2259/814* (2013.01); *B01F 2035/98* (2022.01); *B01F 2101/305* (2022.01); *C02F 2303/26* (2013.01)

24 Claims, 12 Drawing Sheets

(56) References Cited

U.S. PATENT DOCUMENTS

| | | | | |
|---|---|---|---|---|
| 11,998,882 | B2* | 6/2024 | Ghaani | B01D 53/1475 |
| 2012/0097752 | A1* | 4/2012 | Okano | B01F 23/238 |
| | | | | 239/102.2 |
| 2013/0042756 | A1 | 2/2013 | Oda et al. | |
| 2014/0158635 | A1 | 6/2014 | Katyal | |
| 2014/0223958 | A1* | 8/2014 | McCormack | C02F 1/22 |
| | | | | 62/123 |
| 2017/0304841 | A1* | 10/2017 | Lee | B02C 19/0018 |

(51) Int. Cl.

| | |
|---|---|
| *B01D 53/32* | (2006.01) |
| *B01F 23/23* | (2022.01) |
| *B01F 23/2375* | (2022.01) |
| *B01F 23/411* | (2022.01) |
| *B01F 31/00* | (2022.01) |
| *B01F 35/21* | (2022.01) |
| *B01F 35/90* | (2022.01) |
| *B01F 35/92* | (2022.01) |
| *B01F 101/00* | (2022.01) |
| *C02F 1/22* | (2023.01) |
| *C02F 3/28* | (2023.01) |

(52) U.S. Cl.
CPC ........ *B01F 23/2375* (2022.01); *B01F 23/238* (2022.01); *B01F 23/411* (2022.01); *B01F 31/00* (2022.01); *B01F 35/2113* (2022.01); *B01F 35/2115* (2022.01); *B01F 35/90* (2022.01); *B01F 35/92* (2022.01); *C02F 1/22*

FOREIGN PATENT DOCUMENTS

| | | |
|---|---|---|
| JP | 2011025203 A | 2/2011 |
| JP | 2014159008 A | 9/2014 |
| JP | 2015052361 A | 3/2015 |
| JP | 2016055262 A | 4/2016 |
| JP | 2017228423 A | 12/2017 |
| KR | 20120026558 A | 3/2012 |
| WO | 2007131917 A1 | 11/2007 |
| WO | 2013143562 A1 | 10/2013 |

* cited by examiner

SYSTEM AND METHOD FOR THE TREATMENT OF BIOGAS AND WASTEWATER

RELATED APPLICATIONS

The present invention is a continuation application of U.S. application Ser. No. 17/285,245, filed on Apr. 14, 2021, which is a U.S. National Stage under 35 USC 371 patent application, claiming priority to Serial No. PCT/EP2019/078017, filed on Oct. 15, 2019, which claims priority of GB 1816766.8, filed on Oct. 15, 2018, the entirety of which are incorporated herein by reference.

TECHNICAL FIELD

The present disclosure relates to systems and methods for treating biogas and wastewater. In particular, but not exclusively, the present disclosure relates to the treatment of biogas and wastewater from anaerobic digestion via nanobubble and gas-hydrate formation. The present disclosure also relates to treating a multi-component mixture. The present disclosure further relates to systems, methods for generating nanobubbles or nanodroplets. In particular, but not exclusively, the present disclosure relates to the generation of nanobubbles or nanodroplets without using electrolysis.

BACKGROUND

Anaerobic Digestion (AD) is the conversion of biodegradable feedstock, such as animal waste, sewage, waste food and the like, in to three principal products: biogas, digestate and water. Extraction of biogas is highly desirable due to the great multiplicity of applications it finds in industry, and particularly in the generation of heat or electricity. However, the contaminants including $H_2S$ are very corrosive and inhibit combustion, and as such significant purification of the biogas is required before it can be effectively utilised. What is more, disposal of waste products from anaerobic digestion without sufficient extraction of biogases such as methane and carbon dioxide is widely understood to have negative environmental effects, such as contributing to greenhouse emissions globally. Existing methods of purification such as pressure-swing absorption, cryogenic separation, chemical washing and membrane technology typically have significant capital and operating costs. What is more, existing purification methods are generally only cost-effective at large scales of biogas production meaning small-scale, localised solutions are not economically feasible.

The digestate, which is the precipitate remaining after biogas extraction, may be used in fertiliser, compost and the like. The waste water remaining after extraction of the biogas and digestate, however, typically contains pollutants or other undesirable contaminates which necessitate treatment of the water output.

The value of nanobubbles to industry can be seen clearly in the great multiplicity of applications they have found therein. Their high metastability in liquids has found nanobubbles a popular application in gas storage on the scale of months. Moreover, their high surface area:volume ratio has meant that they are useful in surface cleaning applications as they are able to cling to insoluble dirt on surfaces. Nanobubbles have also found wide usage in wastewater treatment by flotation, and furthermore in bio-gas applications including controlling methane emissions from agriculture.

Such applications have motivated significant amounts of research in to the various physical properties of nanobubbles and means of producing them. The cavitation effect for example, in which a sudden change in pressure in a liquid causes the formation of low-pressure cavities, has been used to produce nanobubbles.

These methods have been found to be costly in terms of energy requirements and the physical apparatus required. Moreover, some methods require additives in the process which contaminate the liquid, whilst also producing relatively low gas solubility.

US Published Patent Application no. 2018141837 relates to a nanobubble and Hydroxyl Radical Generator (NBHRG) and a processing system to decontaminate water without chemicals using NBHRG. Published PCT Patent Application no. WO2005084786 relates to water containing oxygen nanobubbles and a method for production. US Published Patent Application no. US20100147701 relates to a method and apparatus for applying an alternating electric field through a liquid to enhance sanitizing properties. Published PCT Patent Application no. WO2017156410 relates to a method and an apparatus for producing nanobubbles, wherein a gas is supplied to the apparatus at a pressure such that the gas is forced through a porous sidewall and forming nanobubbles on the outer surface of a gas-permeable member. These technologies are based around methods using water electrolysis, which is a process whereby water is split to hydrogen and oxygen and the produced gases forms nanobubbles; and hydrodynamic cavitation, a process of vaporisation, bubble generation and bubble implosion, which occurs in a flowing liquid as a result of a decrease and subsequent increase in localised pressure. The methods that involve electrolysis require direct liquid-electrical contact of water and an electrode or electrical discharge, or the introduction of another ion source. Alternatively, methods that do not use electrolysis, such as hydrodynamic cavitation, are thought to be less efficient at generating sustainable nanobubbles and lead to reduced solubility enhancement.

Various methods are known heretofore relating to the preparation of nanobubbles, however, such methods typically introducing electrolysis or foreign substances (e.g., ions) in the water in which the nanobubbles are created which may result in contamination. Published PCT Patent Application no. WO2014148397 uses water electrolysis, yielding water splitting to hydrogen and oxygen where the produced gases form nanobubbles. Published PCT Patent Application no. WO2005084786 uses ultrasonic irradiation, and furthermore uses additive ions to stabilise the nanobubbles. US Published Patent Application no. US20070189972 relates to a method of forming nanobubbles by applying physical irritation to microbubbles contained in a liquid so that the microbubbles are abruptly contracted to form nanobubbles. Moreover, this method also involves the use of additive ions. Forming comparatively larger quantities of nanobubbles without microbubbles is operationally facile and energy efficient, yielding higher gas solubility.

Published European Patent Application no. EP2986975 relates to methods and systems for controlling nanobubble and nanoparticle dynamics in conical nanopores.

There is therefore a need for methods and systems for treating biogas and wastewater produced from an anaerobic digester which address at least some of the drawbacks of the prior art. Furthermore, there is also a need for methods and systems for treating a multi-component mixture. Additionally; there is a need for a method, system and apparatus for generating nanobubbles or nanodroplets which address at least some of the drawbacks of the prior art.

SUMMARY

Accordingly, there is provided a method of producing nanobubbles or nanodroplets; the method comprising:
providing a volume for accommodating a liquid;
distributing a medium within the liquid;
generating an electric field using an electrode in the proximity of the volume for facilitating the generation of nanobubbles or nanodroplets; wherein the electrode and the liquid are not in direct electrical contact to prevent electrolysis occurring within the volume.

In one aspect, the medium is a gas medium. Advantageously, the gas medium comprises a mixture of two or more gases. Preferably, at least one of the gases is enriched.

In another aspect, the medium is a liquid medium. Advantageously, the liquid medium is a mixture of two or more liquid components. Preferably, at least one of the liquid components is enriched.

In one aspect, the liquid is an aqueous liquid.

In a further aspect, the liquid comprises deionised water.

In an exemplary aspect, the electric field is a static electric field.

In another aspect, a cooling means is provided for cooling the contents of the volume. Advantageously, the cooling means circulates a coolant in the proximity of the volume.

In one aspect, the method comprises evacuating the volume.

In a further aspect, the method includes agitating the contents of the volume. Advantageously, the agitating is provided by a rocking motion.

In an exemplary arrangement, the method includes sensing temperature; and/or sensing pressure.

In one example, the volume of liquid is about 20 cm$^3$. Advantageously, a pressure of up to 100 bar is applied to the volume. Preferably, a DC voltage of about 30 V is applied to the electrode.

In one aspect, an acoustic signal is applied for releasing the nanobubbles or nanodroplets from the liquid.

In another aspect, a magnetic signal is applied for releasing the nanobubbles or nanodroplets from the liquid.

In one aspect, the volume is cooled to a predetermined level for facilitating storing the nanobubbles or nanodroplets within the body of the liquid. Advantageously, the body of liquid is frozen.

In an exemplary aspect, there is provided a method of producing nanobubbles or nanodroplets; the method comprising:
providing a volume for accommodating a liquid;
distributing a medium within the liquid;
generating an electric field in the proximity of the volume for facilitating the generation of nanobubbles or nanodroplets; wherein electrolysis does not occur within the volume.

The present disclosure also relates to a generator for producing nanobubbles or nanodroplets; the generator comprising:
a volume for accommodating a liquid;
a source for supplying a medium to the volume for distributing within the liquid;
an electrode for generating an electric field in the proximity of the volume for facilitating the generation of nanobubbles or nanodroplets; wherein the electrode and the liquid are not in direct electrical contact to avoid electrolysis.

In one aspect, the source comprises a gas source for supplying a gas medium.

In another aspect, the source comprises a liquid source for supplying a liquid medium.

In a further aspect, the electrode is configured for providing a static electric field.

In an exemplary arrangement, the generator further comprises a cooling means for cooling the contents of the volume. Advantageously, the cooling means is configured for circulating a coolant in the proximity of the volume. In one example, at least a portion of the generator defines a passageway for accommodating the coolant therein.

In another aspect, a vacuum means is provided for evacuating the volume.

In a further aspect, an agitating means is provided for agitating the contents of the volume.

Advantageously, the agitating means comprises a mechanical agitator.

In one aspect, the electrode comprises a cathode and an anode.

In another aspect, the cathode and anode are restricted from direct electrical contact with the contents of the volume to prevent electrolysis occurring within the volume.

In one aspect, the cathode and anode are coated or covered with an electrically insulating coating or material.

In another aspect, the cathode and anode are arranged in a parallel configuration for providing an electric field with strength inversely proportional to a distance between the cathode and the anode.

In a further aspect, the electrode comprises a plurality of anodes and a plurality of cathodes.

In another aspect, the electrode comprises a mesh configuration. Advantageously, the electrode comprises a plurality of mesh elements.

In an exemplary arrangement, the plurality of anodes and the plurality of cathodes are arranged in parallel configuration.

In one aspect, each mesh element comprises an aperture for receiving a portion of a delivery mechanism therein.

In another aspect, the delivery mechanism comprises an elongated tubular member for extending through the apertures of the mesh elements. Advantageously, the tubular member is operably mounted on a base member.

In one aspect, the delivery mechanism comprises a plurality of outlets for facilitating the distribution of the medium within the volume. Advantageously, the outlets are dimensioned for accommodating the medium therethrough but preventing an ingress of the liquid from the volume.

In another aspect, the electrode is arranged to consist of a series of concentric elements.

In one aspect, the concentric elements may be configured such that each element consists of a cathode and an anode in contact.

In a further aspect, an enricher is provided for enriching the medium.

In one aspect, a storage volume is provided for storing the nanobubbles or nanodroplets in a temperature controlled environment.

In another aspect, the nanobubbles or nanodroplets are frozen for facilitating storage.

The present disclosure also relates to a system for generating nanobubbles or nanodroplets; wherein the system comprises:
a generator comprising a volume for accommodating a liquid;

a source for supplying a medium to the volume for distributing within the liquid;

an electrode for generating an electric field in the proximity of the volume for facilitating the generation of nanobubbles or nanodroplets; wherein the electrode and the liquid are not in direct electrical contact to avoid electrolysis; and a control circuit configured for controlling the generator.

According to one aspect; there is a method of treating wastewater, the method comprising the steps of:

providing a vessel for receiving wastewater and a gas, wherein the gas comprises one or more constituent gas components;

directing the wastewater and a first gas component of the gas to the vessel;

reducing the temperature of the contents of the vessel from a first temperature to a second temperature to facilitate the formation of clathrate hydrates comprising the wastewater and the first gas component;

increasing the temperature of the contents of the vessel with respect to the second temperature to facilitate melting of the clathrate hydrates; and removing clean water and/or the first gas component from the vessel.

In one aspect, the method further comprises generating nanobubbles of the first gas component.

In another aspect, directing the first gas component to the vessel comprises controllably releasing nanobubbles of the first gas component from a volume. Advantageously; the volume comprises a nanobubbles generator. Preferably; controllably releasing the nanobubbles of the first gas component comprises applying a signal to the liquid storing the nanobubbles. In an exemplary embodiment; the signal comprises at least one of an acoustic signal or an electromagnetic signal.

In one aspect; the method further comprises removing residual from the vessel.

In another aspect, the method further comprising removing from the generator a second gas component of the gas. In one example, the first gas component comprises carbon dioxide or carbon monoxide. In one example, a second gas component comprises methane.

According to another aspect; a system for treating wastewater is provided, the system comprising:

a vessel for receiving wastewater and a gas, wherein the gas comprises one or more constituent gas components;

means for directing the wastewater and a first gas component of the gas to the vessel;

a temperature control means configured:

for reducing the temperature of the contents of the vessel from a first temperature to a second temperature to facilitate the formation of clathrate hydrates comprising the wastewater and the first gas component; and increasing the temperature of the vessel with respect to the second temperature to facilitate melting of the clathrate hydrates; and means for removing clean water and/or the first gas component from the vessel.

According, to a further aspect; there is provided a system for treating a multi-component mixture, comprising:

a vessel for receiving a first medium and a second medium;

a source for supplying the first medium to the vessel and a source for supplying the second medium to the vessel;

a temperature control means for controlling the temperature of the contents of the vessel, wherein the temperature control means is configured to control the temperature of the contents of the vessel to facilitate the formation of hydrates comprising the first medium and the second medium, and wherein the temperature control means is configured to control the temperature to facilitate melting of the hydrates to provide a first treated medium and a second treated medium.

In one aspect; the first medium comprises a gas, wherein the gas comprises one or more constituent gas components. Advantageously; the hydrates formed in the vessel are clathrate hydrates.

In another aspect; the system further comprises a nanobubbles generator for generating nanobubbles of a first gas component of the gas, and further comprising at least one conduit for connecting a volume of the nanobubbles generator and the vessel therebetween.

In one aspect, there is provided a method for treating a multi-component mixture, comprising:

providing a first medium to a vessel;

providing a second medium to the vessel;

controlling the temperature of the contents of the vessel to facilitate the formation of hydrates comprising the first medium and the second medium, and controlling the temperature of the contents of the vessel to facilitate melting of the hydrates to provide a first treated medium and a second treated medium.

In one aspect, the first medium comprises a gas, wherein the gas comprises one or more constituent gas components.

Furthermore, the present disclosure relates to a method of releasing nanobubbles or nanodroplets from a liquid; the method comprising controllably releasing the nanobubbles or nanodroplets by applying a signal to a liquid storing the nanobubbles or nanodroplets; wherein the signal comprises at least one of an acoustic signal, or an electromagnetic signal.

BRIEF DESCRIPTION OF FIGURES

The present teaching will now be described with reference to the accompanying drawings in which.

DETAILED DESCRIPTION OF FIGURES

Figure 1:
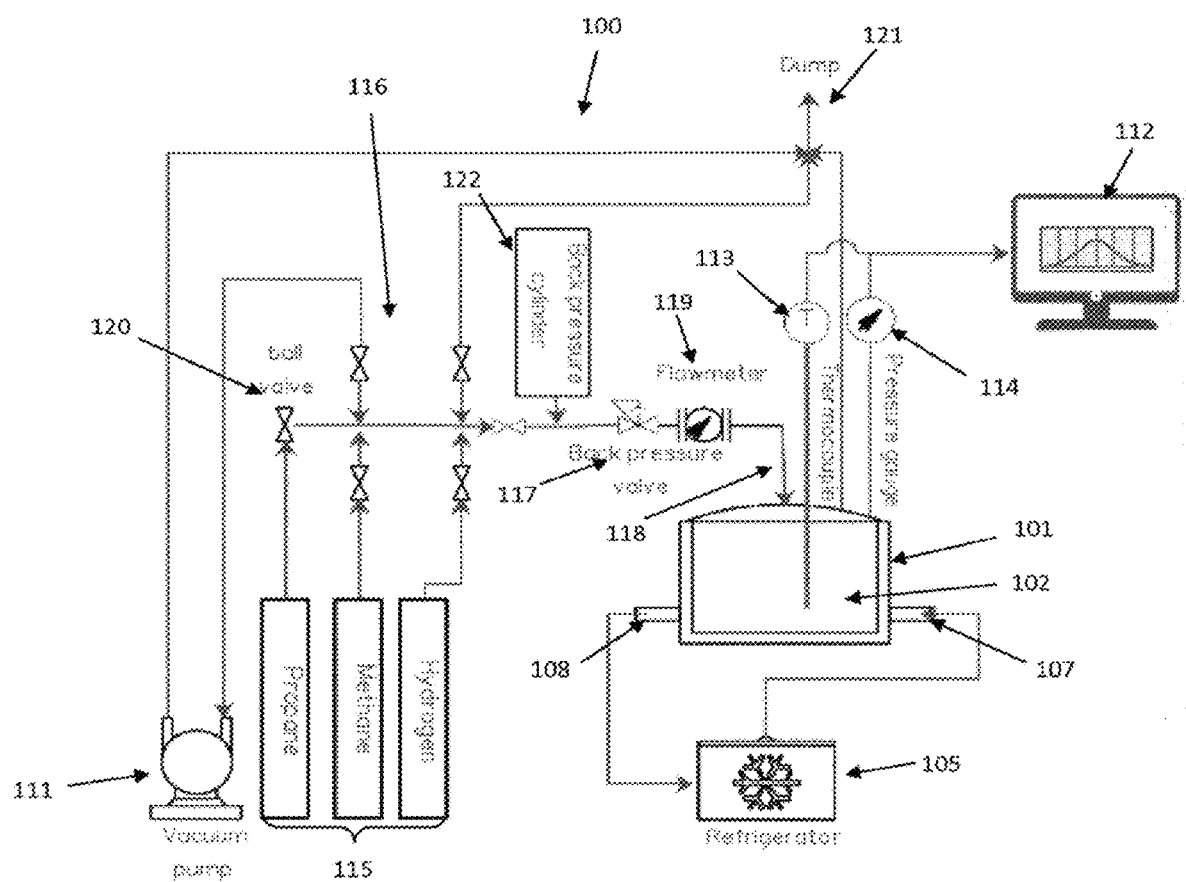
FIG. 1 depicts a process diagram detailing a system used in carrying out the method of producing nanobubbles or nanodroplets in accordance with the present disclosure.

The present disclosure will now be described with reference to an exemplary method, generator and system for treating biogas and wastewater from anaerobic digestion via nanobubbles and gas-hydrate formation. It will be understood that the exemplary methods, generator and system are provided to assist in an understanding of the teaching and is not to be construed as limiting in any fashion. Furthermore, elements or components that are described with reference to any one Figure may be interchanged with those of other Figures or other equivalent elements without departing from the spirit of the present teaching. It will be appreciated that for simplicity and clarity of illustration, where considered appropriate, reference numerals may be repeated among the figures to indicate corresponding or analogous elements.

Figure 2:
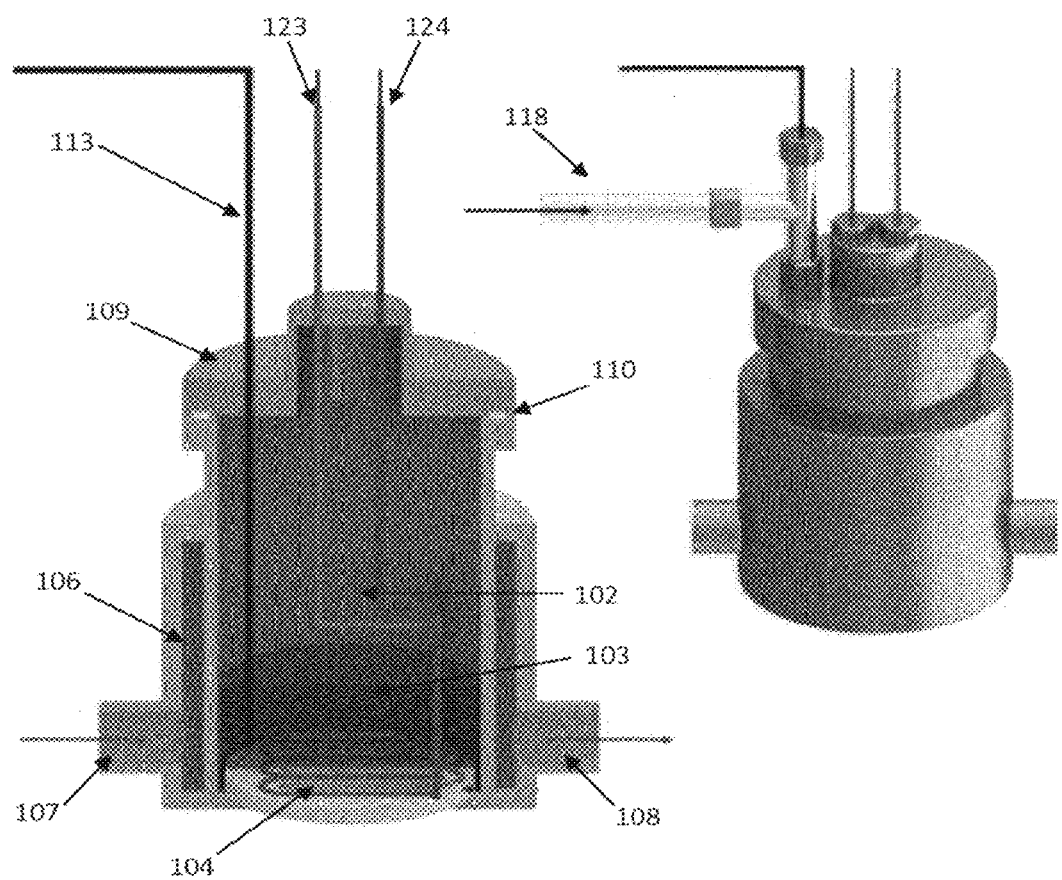
FIG. 2 depicts an embodiment of a generator, including its cross section which forms part of the system of FIG. 1.

Referring to the drawings and initially to FIGS. 1 and 2 there is illustrated a system 100 for generating nanoelements which may be nanobubble or nanodroplets in accordance with the present disclosure. The system 100 comprises a generator 101 in which the nanoelements are generated. The generator 101 comprises a hollow interior region defining a volume 102 which accommodates a liquid 103 therein. In the exemplary embodiment, the liquid 103 may be deionised water or another aqueous solution. A medium in the form of a gas or a liquid is supplied to the vessel 102 for distributing within the liquid 103. An electrode 104 as best illustrated in FIG. 2 is provided for generating an electric field in the proximity of the volume 102 for facilitating the generation of the nanoelements therein. The electrode 104 and the liquid 103 are not in direct electrical contact to avoid electrolysis occurring within the volume 102. In the exemplary embodiment the electrode 104 is covered or coated with an insulating material or coating; or the like.

A cooling means such as a refrigerator or an isothermal bath 105 is provided for cooling the contents within the volume 102. The isothermal bath 105 is configured for circulating a coolant through at least a portion of the generator 101 in the proximity of the volume 102. In the exemplary embodiment, the generator 101 is double walled with a passageway 106 provided for accommodating the flow of the coolant therein. The coolant is introduced to the passageway 106 through an inlet tube 107. The coolant is then returned to the isothermal bath 105 via an outlet tube 108. It will be understood by those skilled in the art that there exists a plurality of coolant agents which may be used as the coolant. For example, in an exemplary embodiment the coolant is provided as a mixture of water and ethylene glycol. Alternatively, the coolant may be an antifreeze agent. The isothermal bath 105 is operable for supplying a coolant in the temperature range 263-343K.

The generator 102 further comprises a sealing means for sealing the volume 102. The sealing means may comprise a closure cap 109 and a sealing gasket 110 for operably engaging with the side walls of the generator 102. In the exemplary embodiment, the sealing gasket 110 is made of Teflon. A vacuum means may be provided for evacuating the volume 102, which may be provided by a vacuum pump 111, for example. An agitating means may be provided for agitating the contents of the volume. In an exemplary embodiment, the agitating means comprises a mechanical agitator (not shown) which may be configured to provide a rocking motion.

Parameters associated with the generator 102 may be monitored using a data-acquisition system 112. A temperature sensor 113 is provided for sensing temperature associated with the contents of the volume 102. In the exemplary arrangement, the temperature sensor comprises a thermocouple. A pressure sensor 114 is provided for sensing pressure associated with the generator 102. In one example, the temperature associated with the generator 102 is monitored using a platinum resistance thermometer (thermocouple). Both temperature monitored with the temperature sensor 113 and pressure monitored with the pressure sensor 114 were recorded in intervals using the data acquisition system 112.

The generator 102 further comprises a source 115 of the medium. In the exemplary embodiment, the source 115 includes three discrete gas sources which are selectively controlled for providing an appropriate gas or a combination of gases to the volume 102. While FIG. 1 illustrates that the three gas sources are propane, methane, and hydrogen, it will be appreciated by those skilled in the art that any appropriate gas source may be used and it is not intended to limit the disclosure to the exemplary gases described. The generator 102 is controlled via a control circuit 116. The control circuit 116 is in communication with the source 115, vacuum pump 111, temperature sensor 113, pressure sensor 114, data-acquisition system 112, and isothermal bath 105. A back-pressure valve 117 facilitates the controlled introduction of the medium from the source 115 to the vessel 102 without the loss of the liquid 103 from the volume 102. An inlet conduit 118 facilitates the routing of the medium from the source 115 to the volume 102. A flow meter 119 is provided for metering the flow of the medium to the volume 102.

In use, the introduction of gas from the gas source 115 to the volume 102 is controlled via a series of ball valves 120, and will be described in greater detail further down. Control of the gas source 115 includes altering the series of ball valves 120 to route the gas or a combination of gases to either the vacuum pump 111 or a dump 121 should the need arise. A back-pressure cylinder 122 accommodates gas flow if the back-pressure valve 117 closes.

Figure 3:
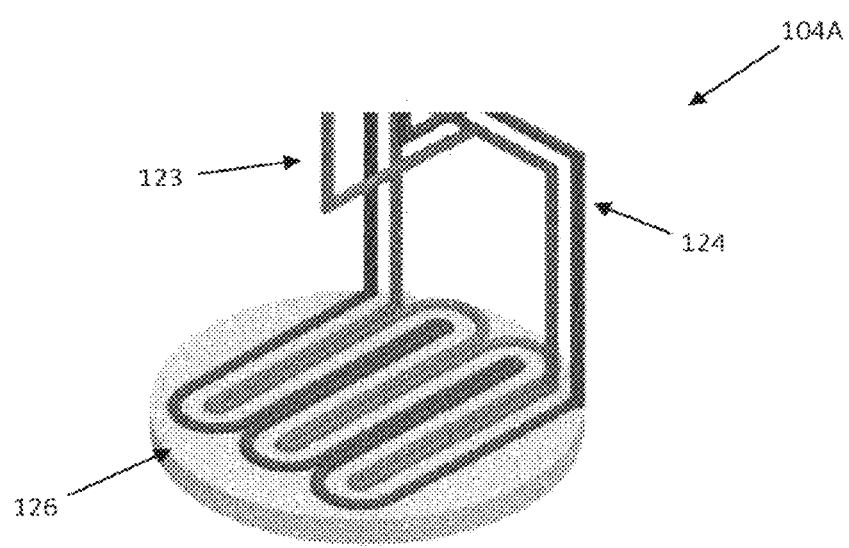
FIG. 3 is a perspective view illustrating one exemplary embodiment of the electrode.

FIG. 2 details a cross-section of the double walled generator 101 including the volume 102 wherein the liquid 103 and the medium are loaded. In the exemplary embodiment, the liquid 103 is deionised water and has a volume of 20 cm$^3$. It will be appreciated by those skilled in the art that the liquid 103 may include any suitable aqueous solution and that deionised water is provided by way of example. An electrode 104, as best illustrated in FIG. 3, comprises a cathode 123 and anode 124 which in the exemplary embodiment are routed to the bottom of the volume 102 in a parallel arrangement which generate a static electric field which is applied to the contents of the volume 102. The effect of the electric field results in the formation and build-up of nanobubbles of the gas medium or nanodroplets of the liquid medium inside the liquid 103. A DC electric current is applied to the electrode 104 producing a potential difference of up to 60 Volts. Greater voltages are envisaged by the inventors in a manifestation of the present disclosure scaled upward in proportions of other parameters used, for example the volumes of the liquid 103 and the medium introduced to the volume 102.

Importantly, an advantageous feature of the present disclosure is that none of the embodiments of the electrode 104 are in direct electrical contact with the liquid-gas mixture, having been coated or covered with an insulating coating or material; or the like. This insulating coating may, for example, be a dielectric paint or other suitable material. Thus the present disclosure differs from the electrolysis-based methods known heretofore. Facile, controlled and on-demand extraction of nanobubbles is conducted by applying an acoustic signal, such as an acoustic impulse to the contents of the volume 102 containing the nanobubbles. After the acoustic signal is applied for a determined period the nanobubbles or nanodroplets are completely extracted from the liquid 103 such that the volume 102 predominantly contains the liquid 103. Not only is this method of extraction sufficiently facile and controllable, but it also allows for extraction over periods of time which far precede the metastability of nanobubbles which can extend to time scales of months. The facile, controlled and on-demand release of nanobubbles may furthermore be conducted using magnetic fields. The magnetic field may be supplied by a permanent magnet, although other means are envisaged by the inventors, for example an electro-magnetic pulse or series of pulses. Furthermore this method of extracting nanobubbles of the gas or nanodroplets of the liquid medium is energy efficient as described below with reference to FIG. 9.

FIG. 3 depicts a first-generation embodiment of the electrode 104A consisting of cathode 123 and anode 124 set in parallel and placed at the base 126 of the volume 102. A finite element study conducted by the inventors found that only 30% of the liquid 103 in the volume 102 was exposed to the electric field in this embodiment. Consequently, two further embodiments were developed.

Figure 4:
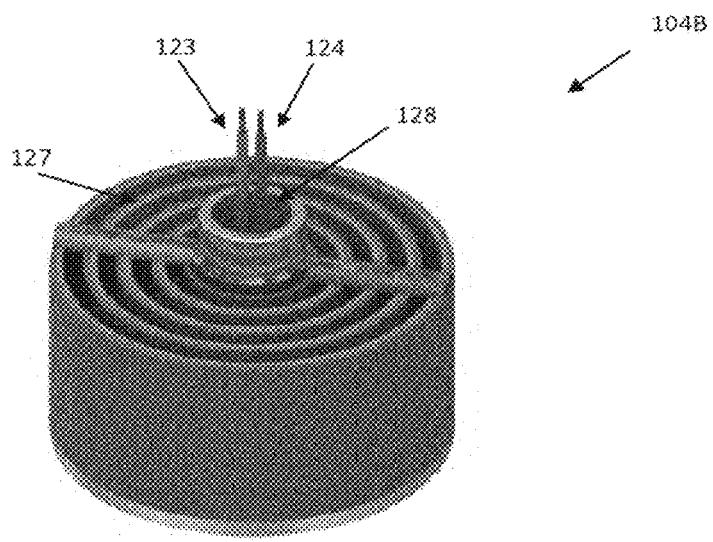
FIG. 4 is a perspective view illustrating another exemplary embodiment of the electrode.

FIG. 4 depicts a second-generation embodiment of the electrode 104B consisting of concentric elements 127, each concentric element 127 further comprising a cathode 123 and an anode 124 set in contact parallel at any given point on a concentric element 127. Both the cathode 123 and the anode 124 are routed through a central aperture 128 to their respective electrical contacts. This embodiment permits a greater degree of exposure of the liquid 103 to the electric field compared with the first embodiment depicted in FIG. 3, the liquid 103 being routed to the cavities between the concentric elements 127.

Figure 5:
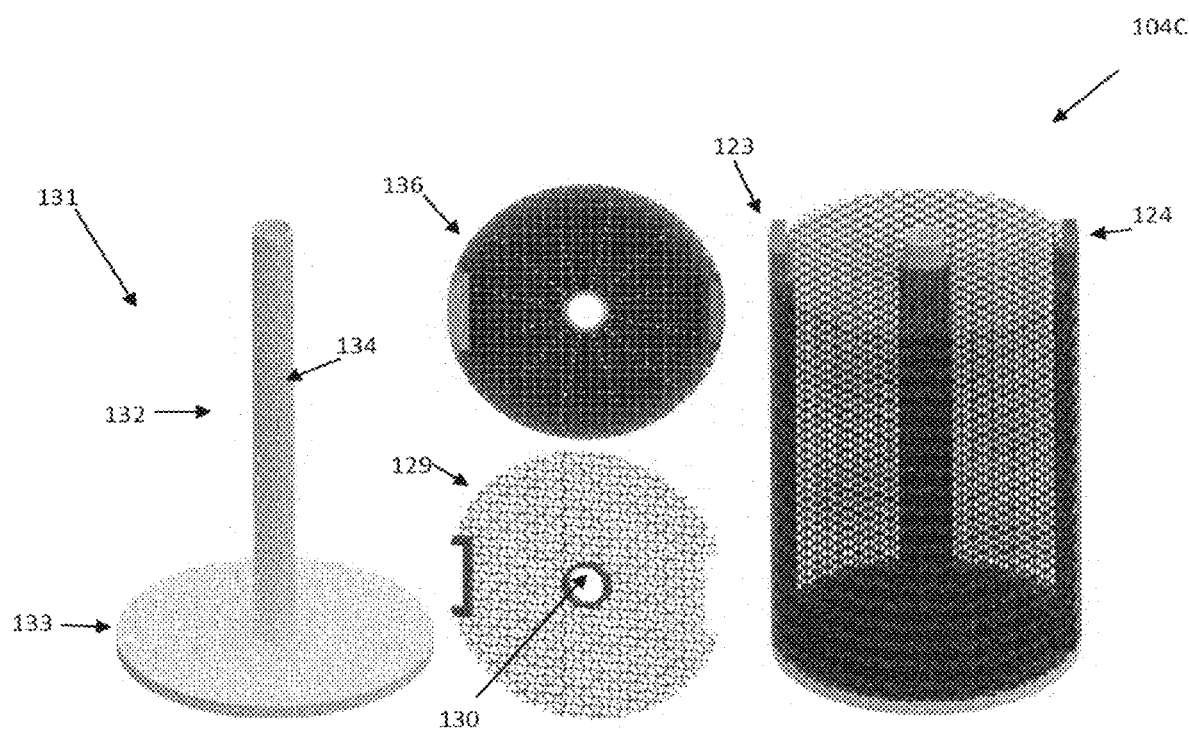
FIG. 5 is a perspective view illustrating a further exemplary embodiment of the electrode.

FIG. 5 depicts a third-generation embodiment of the electrode 104C, wherein the electrode 104 comprises a plurality of cathodes 123 and a plurality of anodes 124 arranged in a parallel configuration and connected to a plurality of mesh elements 129. Each mesh element 129 comprises an aperture 130 for receiving a portion of a delivery mechanism 131 which is used for delivering the gas medium or liquid medium to the volume 102. The delivery mechanism 131 comprises an elongated tubular member 132. The elongated tubular member 132 is dimensioned such that it extends through the apertures 130 of the mesh elements 129. In the exemplary embodiment, the elongated tubular member 132 is operably mounted on a base member 133. Both the elongated tubular member 132 and the base member 133 may be made of any of suitable insulating materials, for example certain polymers. The delivery mechanism 131 comprises a plurality of outlets 134 for facilitating the distribution of the medium within the volume 102. These outlets 134 are dimensioned such that the medium is accommodated but the liquid 103 is prevented from entering the interior volume defined by either the elongated tubular member 132 or the base member 133.

The outlets 134 on the base member 133 are positioned with respect to the mesh elements 129 such that the medium introduced to the volume 102 from the source 115 is not trapped near the bottom of the volume 102 by the material wire of the mesh elements 129. The cross-section 136 depicts the arrangement of the outlets 134 with respect to the mesh elements 129. In the exemplary embodiment, the outlets 134 extend radially on the base member 133 from the tubular member 132. The cathode 123 and the anode 124 are both connected separately to their own collector bus bars on opposite sides of the conducting mesh 31 so as to avoid undesired short circuiting. This embodiment of the electrode 104 increases 10-fold both the levels of liquid exposure to the electric field and the electric field strength compared with previous embodiments, and as such the inventors envisage that this embodiment is furthermore scalable for industrial applications.

The levels of metastable gas solubility achievable from this method are significantly higher than those known heretofore as illustrated in Table 1. For methane, it is found that levels of gas solubility are 22.5 times higher than the de facto Henry's law for methane, while for oxygen levels of gas solubility are 2.5 times greater with this method. For carbon dioxide, the de factor Henry's law coefficient is found to be increased by a factor of 15. It is envisaged by the inventors that this has clear applications in the gas storage industry. It is furthermore envisaged by the inventors that this has significant uses in reducing industrial carbon emissions.

TABLE 1

| | Stored methane inside water as bubble in bubble form | | | | | |
|---|---|---|---|---|---|---|
| Gas | Pressure (bar) | Temperature (° C.) | Compressibility factor | n (mol) | Henry's law delta n (mol) | Observed delta n (mol) |
| Oxygen | 99.3 | 2.2 | 0.9253 | 1.38 | $3.92 \times 10^{-3}$ | $5.90 \times 10^{-3}$ |
| | 98.9 | | 0.9255 | 1.37 | $3.90 \times 10^{-3}$ | |
| Methane | 90.3 | 14.6 | 0.8402 | 1.44 | $3.07 \times 10^{-3}$ | $6.36 \times 10^{-2}$ |
| | 86.5 | | 0.8406 | 1.39 | $2.94 \times 10^{-3}$ | |

Furthermore, this method can also be applied to phase mixtures (a plurality of gases or a plurality of liquids) in contact with the parent liquid phase referred to in the present disclosure as the liquid 103. One possible realisation of this, although it should not be understood to be the limit of its scope, is a mixture of methane and carbon dioxide. The carbon dioxide Henry's law coefficient solubility in milligrams per litre is 30 times greater than methane's Henry's law coefficient solubility. The application of an electric field to such a mixture as in the method of the present disclosure will lead to a 12-fold increase in carbon dioxide solubility and thus a significantly greater portion of carbon dioxide than methane will be diffused in to the liquid, purifying the methane to a level in the range 97-98%. This has significant applications for example in the bio-gas industry for controlling methane production in agriculture, or for treating biogas from anaerobic digesters (e.g., in the waste-water treatment industry). Corrosive contaminates such as $H_2S$, which may also inhibit combustion may be removed, making feasible the use of biogas in the generation of heat and/or electricity for example in a combined heat-and-power cycle.

Methods of producing nanobubbles which do not use electrolysis have historically been understood to be less energy efficient, however the present disclosure is significantly more energy efficient than any prior art disclosures. From this perspective the skilled person will understand that the present disclosure has significant value to industry.

Figure 6:
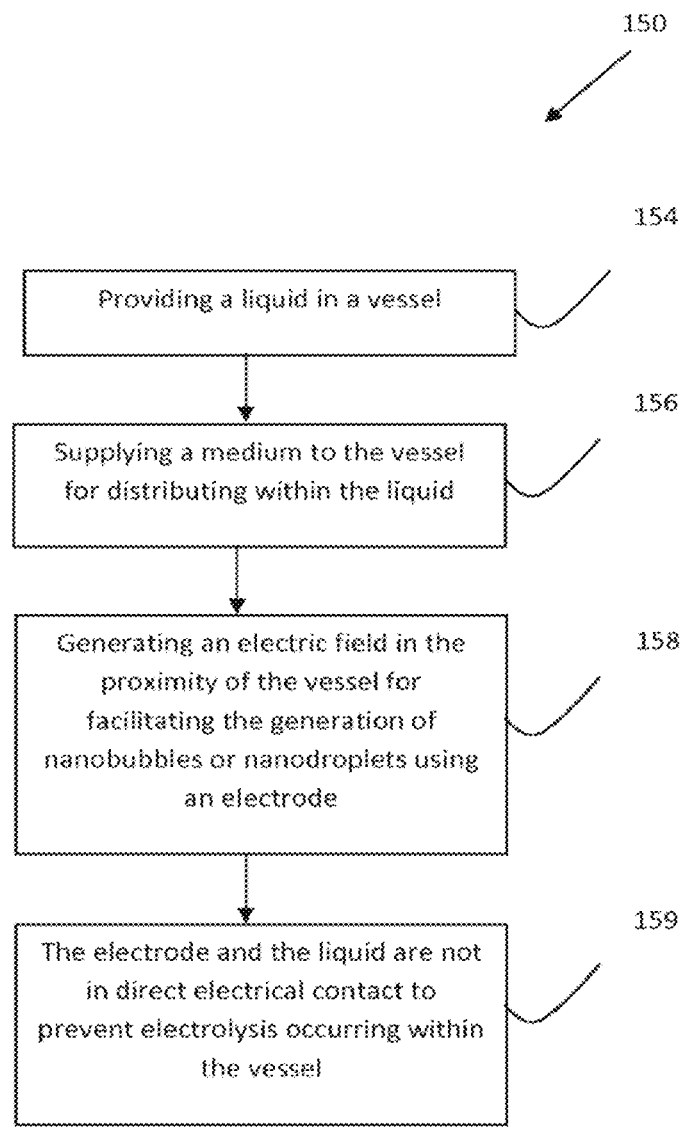
FIG. 6 is a flow chart detailing exemplary steps for producing nanobubbles or nanodroplets.

Referring now to FIG. 6 which illustrates a flow chart 150 detailing exemplary steps for generating nanobubbles or nanodroplets in accordance with the present disclosure. A liquid is loaded within the volume 102, step 154. A medium such as a gas medium or a liquid medium is distributed within the liquid 103 within the volume 102; step 156. An electric field is generated in the proximity of the volume 102 for facilitating the generation of nanobubbles or nanodroplets using an electrode 104; step 158. The electrode 104 and the liquid 103 are not in direct electrical contact to prevent electrolysis occurring within the volume 102, step 159.

The schematic diagram of an exemplary setup in accordance with the present disclosure is illustrated in FIG. 1 which may be used to implement steps of the flow chart 150. It will be appreciated that it is not intended to limit the disclosure to the particular generator 101 described herein which is provided by way of example only. The generator 101 was provided as a stainless steel (SS-316) equilibrium volume 102 with a volume of 340 $cm^3$ and the maximum design pressure of 24 MPa was used to carry out the experiments. The temperature of the volume 102 was controlled by circulating a mixture of water and ethylene glycol as coolant in an isothermal bath 105. The temperature of the isothermal bath 105 was adjustable in the range of 263-343 K. A platinum resistance thermometer (Pt-100) with an accuracy of 0.1 K was used to measure the temperature of the volume 102. Using a double wall generator helps to control the temperature while the cooling liquid does not contaminate the water 103. The thermometer was calibrated against a reference platinum resistance thermometer. The pressure associated with the volume 102 was monitored by a transducer 114 with an uncertainty of ±0.010 MPa. An adjustable-speed-rocking device was used to apply mechanical agitation in the volume 102. The system 100 was also equipped with a data-acquisition program 112 to record temperature and pressure at different time intervals. It will be appreciated that the exemplary values described herein are provided by way of example only and that alternative values may be used.

The cathode 123 and the anode 124 of the electrode 104 are operably connected to a DC power supplier with 30 V potential. The electric field is applied to the water 103. The water 103 was loaded in the first step and the volume 102 is then sealed using a closure cap 109 and a sealing gasket 110. The generator 101 was loaded with 100 bar gas and the pressure is recorded during nanobubble or nanodroplet formation. It will be appreciated by those skilled in the art that it is not intended to limit the present disclosure to the exemplary values described. For example, it is envisaged that the voltage of the DC power supply may be set to any desired value.

Prior to initiating the process, the volume 102 was washed, cleaned and completely dried using a stream of air; this was to clean the volume 102 in which the liquid would be loaded and the medium introduced to, to avoid any contamination. Afterwards, the volume 102 was examined for leakage by injecting nitrogen at a pressure of 1 MPa. The leakage test is to ensure the accuracy of pressure readings during the nanobubble formation. In the next step, the inert gas was purged and a vacuum pump 111 was used for about 30 min to evacuate the trapped gases from the volume 102. This second washing step with inert gas and gas evacuation removes any unwanted gas molecules inside the volume defined by the volume 102. A volume of 20 $cm^3$ of deionised water 3 was loaded into the volume 102; this volume water 103 was found to afford good levels of reproducible performance. The pressure associated with the volume 102 was increased by injecting the selected gas from the source 115 until the desired pressure was reached. In the exemplary experiment, about 100 bar of gas was loaded to the volume 102. The water 103 was saturated after about 2 hours of gas-water contact in the presence of mechanical agitation. An adjustable-speed-rocking device (not shown) was used to increase mechanical agitation in the volume 102. This mechanical agitation renders the water turbulent, for better water-gas contact, which leads to higher bubble-formation yields. Then, a DC electric current (0-60 V) was applied while the pressure and temperature was logged every second. It will be appreciated that the exemplary values described herein are provided by way of example only and that alternative values may be used.

Figure 7:
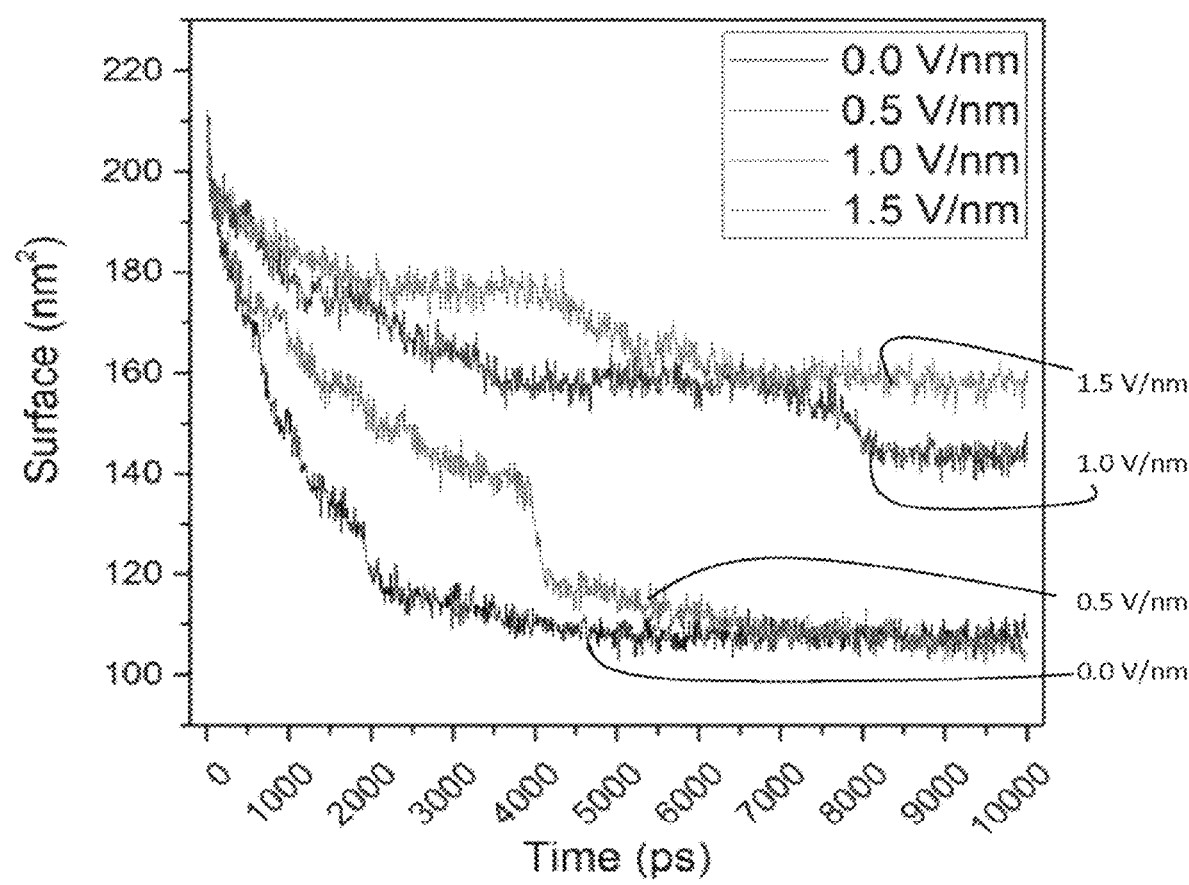
FIG. 7 is a graph illustrating the relationship between the surface area of the nanobubbles and the enhancement to their stability, at various applied electric field strengths.

Molecular-dynamics simulations were used to study the mechanism of nanobubble formation in externally-applied electric fields and to characterise their stability conditions. Nanobubbles have been seen from molecular dynamics of hydrate break-up in electric fields. The present inventors studied the stability of nanobubbles under an applied electric field, the results show higher stability of the hydrate at higher field strength as illustrated in FIG. 7.

Figure 8:
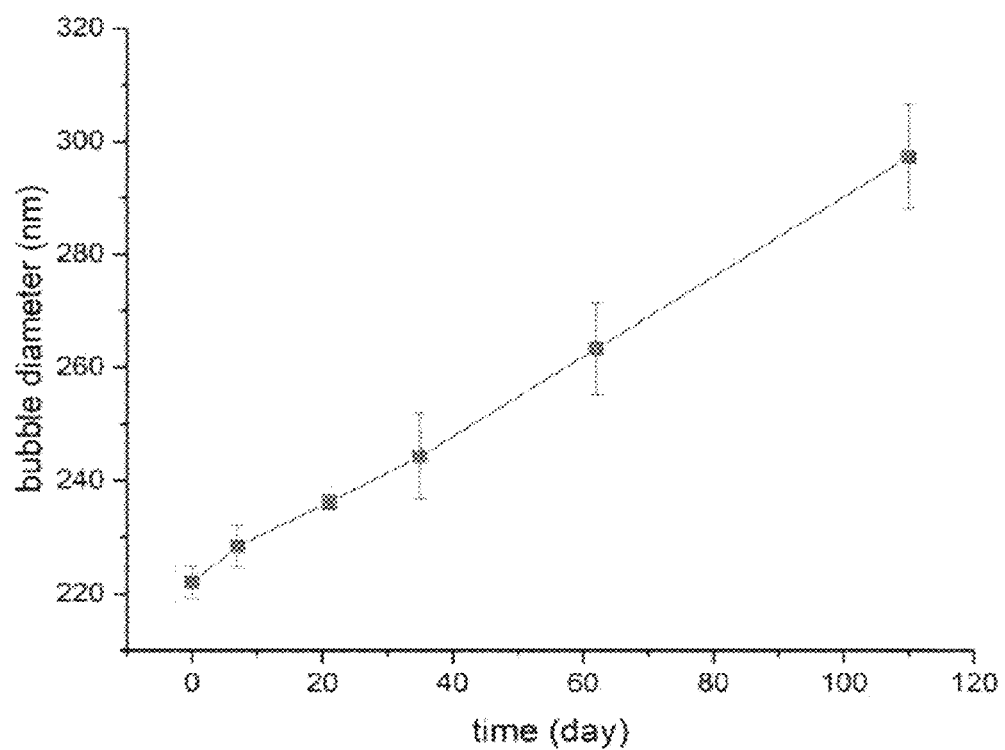
FIG. 8 is a graph illustrating the relationship between nanobubble size and nanobubble lifetime.

After the formation of methane nanobubbles, the solution was stored for three months under ambient condition (pressure, temperature) and was characterized using the dynamic light scattering method. The results show that during the aging period the nanobubbles were merging together such that the bubble size was increased, but this increase is not enough to force the nanobubbles to leave the water medium as illustrated in FIG. 8.

Figure 9:
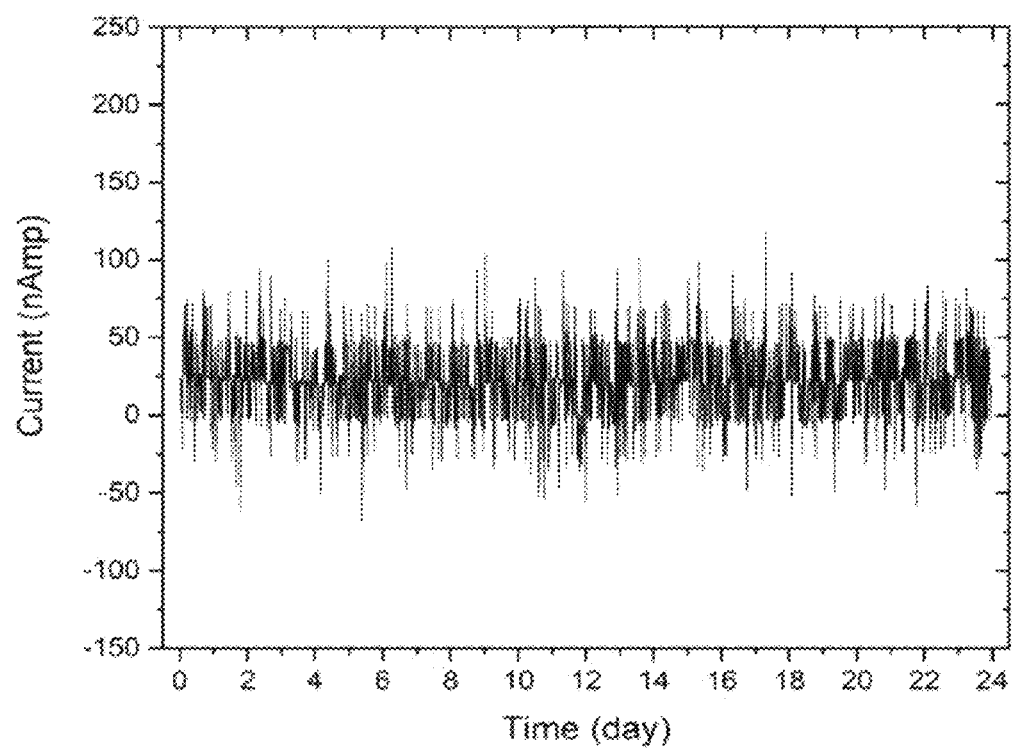
FIG. 9 is a graph illustrating the variation of the current of the DC power supply over a 24-hour time period.

The energy of nanobubble formation during 24 hours of the formation process can be calculated based on the stored energy inside the volume 102, where the combination of the electrode 104 and water 103 can mimic a capacitor with about 3 nF capacity. During the nanobubble formation the dielectric value of the water 103 varies, which can be considered as the capacitor leakage. To compensate the leakage extra energy has to be added into the system 100. So, to calculate the total energy, the applied current was logged with the data acquisition system 112 during this formation process. The graph of FIG. 9 shows current variation as a function of time. The observed current is very low, but the average of this oscillation during a 24 hour period is 22 nAmp which means it is required to add 1.9 milliCoulombs to the capacitor to stay at the same level of energy. Thus, the total energy to form nanobubbles for 24 h will be:

$$U = \left(\frac{1}{2} \times C \times V^2\right) + \left(\frac{1}{2} \times q \times V\right) = \left[\frac{1}{2} \times (3 \times 10^{-9}) \times 30^2\right] +$$
$$\left[\frac{1}{2} \times (1.9 \times 10^{-3}) \times 30\right] = 28.5 \times 10^{-3} \text{ J} \cong 28.5 \text{ mJ}$$

This is a notably small amount of energy provision for only 20 ml of liquid 103, pointing to significant levels of energy efficiency. This may be understood comparatively with, for example, presently available systems in the waste-water industry. The energy consumption of the present system 100 is 0.3 Whr/m$^3$ of water 103. This is much lower than is presently available with advanced systems in, waste-water industries (40 Whr/m$^3$). Moreover, aeration levels in the waste-water industry presently reach a limit of approximately 0.5 mg/l dissolved oxygen, while the method of the present disclosure achieves levels of 25-30 mg/l. The aeration levels achieved in the present disclosure are furthermore metastable on time scales of months. It will be appreciated that the exemplary values described herein are provided by way of example only and that alternative values may be used.

The key parameters in the method in accordance with the present teaching are:
  Field intensity (E=V/d in the electrode design of FIG. 3) where the V is the applied voltage; and
  d is the distance between cathode and anode in the electrode design.

When using the first-generation electrode 104A, a 30 V is applied to generate a relatively high field intensity. It will be appreciated by those skilled in the art that it is not intended to limit the applied voltage to 60V as other values may be applied. The distance between the cathode and the anode, d, was 5 mm. So the maximum applied field is 12,000 V/m. This d value may be different in the second-generation electrode 104B of FIG. 4 and the third-generation electrode 104C of FIG. 5, so the field intensity will alter accordingly. The distribution is mainly a function of electrode geometry and design.

In general, the molecules' kinetic energy was decreased, so that the nanobubbles are more relaxed, resulting in a faster bubble formation process. On the other hand, extreme low temperature will cause some unwanted reaction such as hydrate formation in case of methane or water freezing. As the result, the inventors selected 15° C. for methane (lower than 13° C. the methane hydrate forms) and 2° C. for Oxygen.

To accelerate nanobubble formation, the inventors realised that more gas molecules are needed to be in contact with water 103. This is achieved by increasing the gas pressure within the volume 102. In the exemplary arrangement, the volume 102 was loaded with 100 bar of gas. The inventors realised that this pressure may be reduced considerably by changing the purging system or adding a pre-saturating step by using an enricher.

Figure 10:
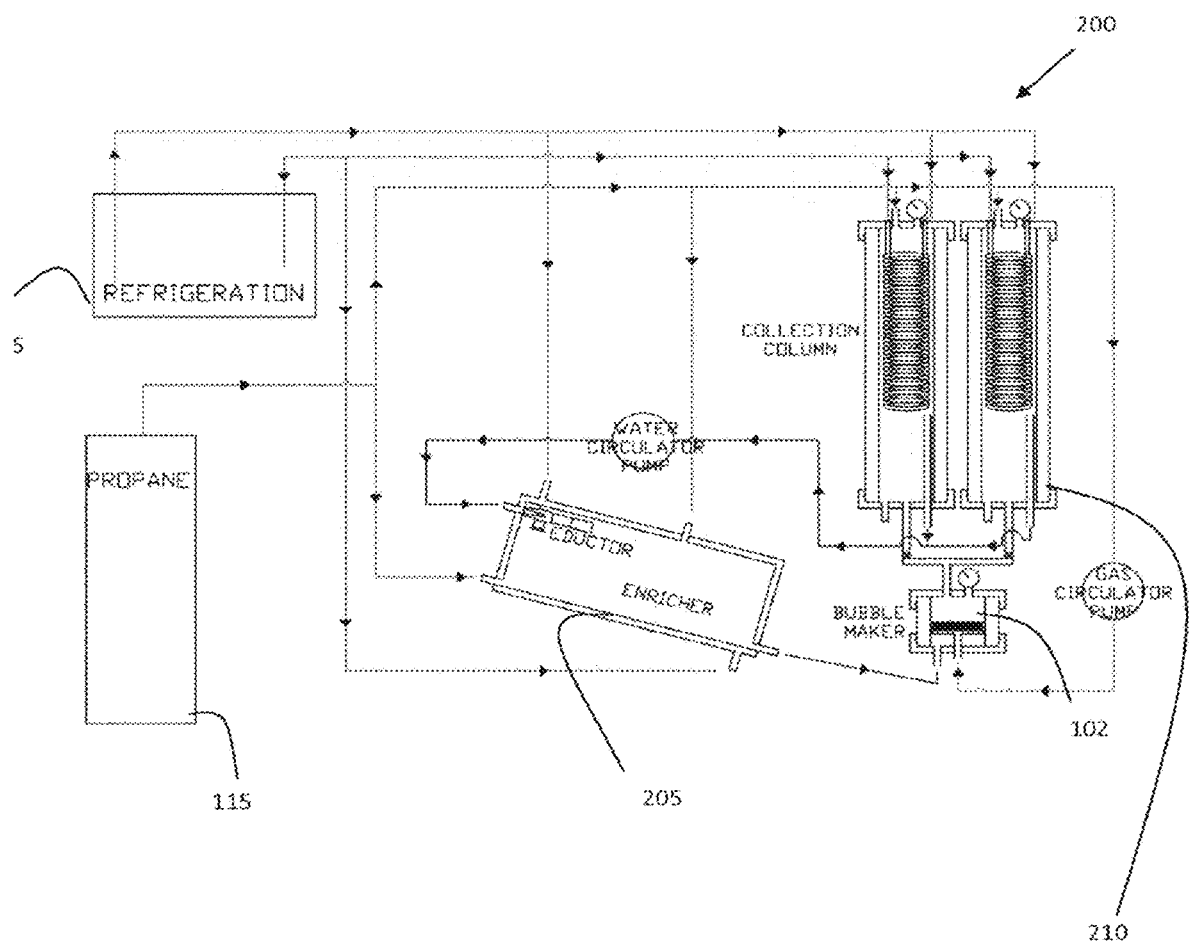
FIG. 10 is another system for generating nanobubbles or nanodroplets which is also in accordance with the present teaching.

Referring to FIG. 10, there is illustrated another system 200 for generating nanobubbles or nanodroplets which is also in accordance with the present teaching. The system 200 is substantially similar to the system 100 and like elements are indicated by similar reference numerals. The main difference between the system 200 and the system 100 is that the system 200 includes an enricher 205 for enriching the gas medium. The inventors realised that performance is optimised by increasing gas uptake, if that results in lingering higher metastable gas capacity upon field removal and depressurisation for even more extended periods of time beyond months. That is T, P and E-field intensity in a $2^3$ DoX factorial design. For instance, one could use 40 and 160 bar, 1 and 35° C. and ~5,000 V/m and 20,000 V/m for (estimated) electric-field intensity in a series of 8 experiments to develop a regression fit, etc., for two dependent variables: the dissolved-gas level in the tank under E-field and P conditions, and, secondly, for dissolved-gas level (mg/l) in the hours after removal from the pressure volume 102 and storage at ambient pressure in the lab.

A storage vessel 210 may be used for storing the nanobubbles/nanodroplets. In the system 200 the storage vessel 210 is at 3-4° C. which slows reverse nanobubble cavitation and agglomeration to micro-size (and escape to gas phase). However, for longer-term storage (in terms of months), or for transport of the liquid containing nanobubbles, water containing nanobubbles is frozen straight after taking it out of the volume 102 for longer-term storage of the nanobubbles in water. It is then thawed out for use later.

Notably, freezing the liquid (containing nanobubbles) at high pressure whilst still in the volume 102 will allow for time-preservation of much higher levels of de-facto gas solubility. For example, it is possible to achieve high levels (thousands of mg/l) of, for example, O2 (achieved already to 1,400 mg/l of DO at ~100 bar in the laboratory) in ice, which may then be stored at ambient pressure in a freezer for periods of days; the gas would seep out of the ice, but slowly. If it could be stored in a cheap, commodity ~25 bar pressure-vessel bucket (e.g., plastic, Al), which are commonly/routinely available in the process industries for intermediate pressurised storage during transport, it could be kept in this vessel in a normal industrial/consumer freezer in a very economic manner for longer-term storage and transport with significantly elevated gas levels, and then used elsewhere when thawed in a higher pressure-rated vessel.

Acoustic and/or magnetic-field-exposure may be used for extraction of nanobubbles or nanodroplets to provide controlled, on-demand release. By exposing the storage volume 210 to a ~10-50 N acoustic impulse, the nanobubbles of gas or nanodroplets of liquid are seen to by and large leave the liquid within hours, rather than the many weeks, or some months, of metastability that occurs otherwise. The inventors also realised that magnetic fields may be used for providing a controlled release of the nanobubbles or nano-droplets from the water. The magnetic field may be provided using either permanent magnets or an electro-magnetic pulse, or a series of such pulses. The field intensity may be of the order of milli-Teslas or higher.

The differential uptake of species into the aqueous nano-phase fluid (whether as a liquid droplet or a gas, depending, in part, on prevailing temperature and pressure vis-à-vis their respective, species-specific critical points) is an important fundamental feature to be manipulated for improved exploitation of the nano-phase as an agent for species-separation processes.

The development of nanophase-enhanced gas-liquid absorption operations have applications/interests in classic gas-in-liquid absorption in packed columns for various purposes and applications, such as air-quality compliance with respect to gas emissions, or, indeed, liquid-liquid extraction operations. Advantageously, the usual gas-liquid equilibrium constant, of the form $y_i = H_i x_i$ (where $H_i$ Henry's Law Constant, HLC) may be replaced by $y_i = H_i^* x_i$, where $H_i^*$ is an enhanced, de-facto HLC, owing to additional accommodation of the nano-phase. (Given that timescales for this metastable state are over many months, and much shorter than unit operation residence times, this is will be understood to be a pragmatic, and effective, working approximation). Thus, the inventors preserve the corpus of process-engineering design analysis for unit operations, relying on 'equilibrium' conditions.

With a greatly-enhanced surface-area-to-volume ratio evident in the nano-phase, coupled with far more favorable de-facto equilibrium conditions, it will be straightforward to devise and study far more effective multi-component gas-separation/enrichment operations than are currently available commercially. Although this concept of the present disclosure can be applied to pure-gas stripping, it is further highly valuable for differential uptake of multi-component gas mixtures both in the gas phase and dissolved in an immiscible liquid phase (for example, biogas purification and flue-gas treatment as will be described below). In certain embodiments, an in-line gas-chromatography system can be used to confirm gas-enrichment levels, on a near real-time basis, for process-control purposes (i.e., ratio control for gas compositions). Allied molecular-dynamics simulations have indicated microscopic mechanisms of multi-component gas-mixture uptake in liquids, which will allow for further process optimisation.

In certain embodiments, this principle may further be applied to distillation, whether for single or multiple components. Again, for nanobubble-enhanced gas-liquid operations, the 'NB-shifted equilibrium' $y_i = H_i^* x_i$ may be used, where $H_i^*$ is an enhanced, de-facto HLC, owing to additional accommodation of the nano-phase. In preliminary process-simulation results with this shifted equilibrium relationship, a much lower energy consumption (about 40%) has been obtained, as well as a substantially-enhanced vapour-phase enrichment of the most volatile component (MVC) with respect to conventional distillation.

Here, in a preliminary, 'pre-NB' operation, depending on the flue-gas composition, pressure-swing-adsorption (PSA)-type methods can be applied to remove higher $CO_2$ concentrations, especially if the % $CO_2$ is higher than ~10-12%, as it often is in flue-gas emissions from steel and cement plants, as well as power stations or CHP set-ups (whether in the biogas, or any other, sector). Now, once PSA may have been deployed for higher-$CO_2$-concentration flue-gas processing, i.e., for $CO_2$-removal "heavy lifting", "low-hanging fruit" or "economically/operationally beneficial marginal $CO_2$-removal treatment", we have the prospect of NB-enabled differential flue-gas stripping/removal.

In advantageous embodiments of the present disclosure, the passage of (residual) flue gas directly through water, with some preliminary micro bubble formation, e.g., by an eductor or Venturi-type nozzle, and then active nano-bubble/droplet formation as described above, will enable flue-gas enrichment. The $O_2$ and $N_2$, being supercritical, non-condensable gases, will all but disappear, with slight excess (no more than ~2.5-fold) over HLC levels in terms of aqueous concentration. This may leave other (pollutant) gases with greatly-enhanced solubility limits.

In a further embodiment of the removal of gas components from flue-gas, a two-way liquid/gas compartment separated by a plane containing carbon nanotubes (or any other hydrophobic porous-solid network impeding water passage from one side to the other) may be used. Initially, the 'empty' side of the two-way box may comprise a vacuum imposed by a vacuum pump, such that absolute pressure on that side is ~0.3-0.5 bara. Preferably the pressure of this side of the two-way box has a pressure less than 1 bara. The (NB or nanodroplet-laden) liquid water is on the other side of the two-way box. Then (pollutant, hydrophobic) gases (such as CO, $CO_2$, methane, ammonia, etc.) pass over to the gas side through the carbon nanotubes, since their chemical potential drives them to pass the gas phase, with the carbon nanotubes not allowing water through to any appreciable extent.

In embodiments similar to those described above in relation to the removal of gas components from flue-gas, direct air capture (DAC) may be achieved. PSA-type method steps as described above are not particularly needed as a preliminary step, unless desired. It is envisaged that the use of nanobubble generation and hydrophobic or carbon nanotube filtering based on impeding/rejecting the passage of water can be used in further embodiments in addition to "ambient air". More specifically, here, "ambient air" or DAC refers to air, whether indoors or outdoors—but, crucially, at, or near, ambient pressure. However it is envisaged that this can also be applied to air for (seasonal or year-round) farming such as indoor battery farming, with elevated methane levels or ammonia etc., as well as DAC especially in and around cities, beyond dedicated CCS-style systems for point emitters as described above. Further applications of these embodiments may include but are not limited to crop growth, irrigation, hydroponics, fish farms and aquaculture. It will be understood that DAC is further considered highly desirable as part of climate change mitigation efforts and in tackling pollution particularly in urban and industrial settings. As such, any such improvements to DAC methods and systems are widely understood to be advantageous.

Advantageously, for mixtures of immiscible liquids, the liquid-liquid equilibrium-partitioning relationship, of the form $x_{i,k} = K_{i,j,k} x_{i,j}$ (where $K_{ijk}$ is the liquid-liquid partition coefficient for species j in liquid-phase i with respect to k) may be replaced by $x_{i,k} = K_{i,j,k}^* x_{i,j}$ (where $K_{i,j,k}^*$ is an enhanced, de-facto partition coefficient, owing to additional preferential accommodation in one phase). In experiments with immiscible liquids, it has been observed that the generation of nano-droplets to differing extents in each liquid phase achieves substantial species enrichment in one liquid phase. This is a significantly advantageous aspect of the present disclosure, and an important unit operation in the chemical industry. Advantageously, in certain embodiments multicomponent-petroleum nano-droplets may be used as a way of enriching the species concentration of petroleum fractions in water, using the nanodroplet-formation methods described above. In simulations with $x_{i,k} = K_{i,j,k}^* x_{i,j}$, substantial enrichments of petroleum nano-droplets in water have been observed. It is envisaged that such applications may be useful for revisiting mature oil wells.

A further advantageous application of the exemplary generator, system and method for producing nanobubbles is in agricultural settings. Specifically, but not exclusively, the exemplary generator, system and method for producing nanobubbles or nanodroplets may be used in enhancing seed germination. Enhancing seed germination presents numerous benefits to crop-growth productivity in agriculture, animal feed and biofuel production. As discussed, in various embodiments using the exemplary generator, system and method, water with a substantial uptake of a desired gas may be obtained. In some embodiments, the gas may be oxygen. Advantageously, using the exemplary generator, system and method, the water may contain dissolved oxygen levels of up to 25-30 mg/l. By way of example, experimentation was conducted to test the utility of heavily-oxygenated water in enhancing watercress seed germination. Five to six watercress seeds were placed in a 24-slot tray; approximately 70 ml of peat moss was placed in each slot. Approximately 15 ml of deionised water was provided to each slot of a first tray, and 15 ml of deionised water with approximately 15 mg/l of dissolved oxygen (mostly in the form of nanobubbles) was provided to each of the slots of a second tray. After a period of 7 days, the two trays were compared and it was found that, in the tray with the deionised water containing nanobubbles, there was an approximately 35% enhanced seed germination growth compared with the tray containing deionised water without nanobubbles. Accordingly, a further advantageous aspect of the present generator, system and method for producing nanobubbles is its utility in enhancing crop growth. It will be understood that the example of watercress seed germination is provided by way of example only, and ought not to be construed as limiting in any way, shape or form. The use of liquids containing nanobubbles produced according to the present disclosure may be applied to various liquids and gases, and at varying scales dependent on the needs of the user. For example, it is envisaged that the volumes of the liquids and the gases used for nanobubble generation therein may be adjusted for industrial scales in addition to private use. Advantageously, the liquid water to be enriched with DO may be placed in direct contact with atmospheric air, and the nanobubble generation process may follow. This may be achieved by retro-fitting of open-air water (settling) tanks and reservoirs up to a large 'grid' scale.

Advantageously and similarly to the above-described embodiments relating to gas-liquid absorption and liquid-liquid extraction, the solid-liquid equilibrium-partitioning relationship, of the form $z_k = K_{j,k} x_j$ (where $K_{jk}$ is the solid-liquid partition coefficient for species j in the solid phase with respect to k) may be replaced by $x_k = K_{j,k}^* x_j$ (where $K_{j,k}^*$ is an enhanced, de-facto partition coefficient, owing to additional preferential accommodation in the liquid phase as nanobubbles or nanodroplets). In experiments, it has been observed that the generation of nanodroplets or nanobubbles to differing extents in the liquid phase achieves substantial species enrichment in the liquid phase. Solid-liquid leaching is a very important unit operation in the mining and extractive industries. The resultant wastewater, with enhanced mineral and dissolved ionic species, can be treated/cleaned by hydrate formation according to a system and method best described in FIGS. 11 and 12 respectively. Residual water can, if desired, be cleaned further by O2-nanobubble-enhanced activated sludge, as discussed in the foregoing.

In further advantageous embodiments of the present disclosure, stoichiometrically excess $H_2$ may be put into an Anaerobic Digester in the form of nanobubbles to "grid-quality" pure biogas such as biomethane, without need for subsequent purification. As will be discussed below, nanobubble generation may be used for $H_2S$ and $CO_2$ uptake as well in the AD step itself. Thus, the need for ex post facto biogas purification is largely redundant, providing further improvements to state of the art Anaerobic Digesters. The extra hydrogen in the AD step allows it to make much more pure biogas/biomethane, with less $CO_2$ and $H_2S$. Using $H_2$ in nanobubble form allows for even greater levels of methane purity, meaning that much less biomethane enrichment is needed (which can still be done according to the system and method described in FIGS. 11 and 12 below).

Figure 11:
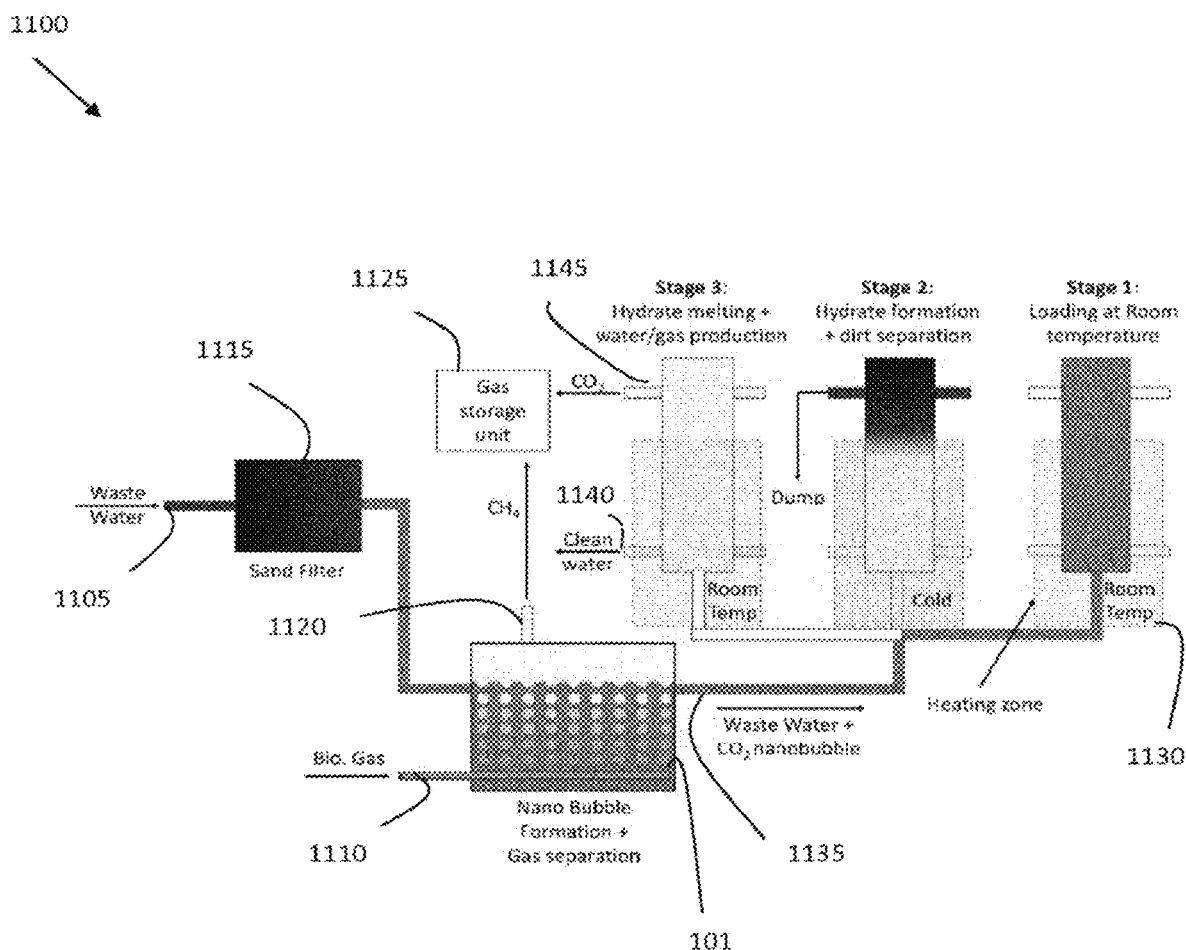
FIG. 11 is an illustration of a system for treating biogas and wastewater, according to an embodiment of the present teaching.

Referring now to FIG. 11, there is illustrated a process-diagram of an exemplary system 1100 for treating a multi-component mixture. In the exemplary embodiment the system 1100 may include the exemplary generator 101 of the previous Figures, however other sources of nanobubbles or nanodroplets are envisaged as being feasible and the generation of a nanophase component on-site is optional and advantageous in various embodiments. In the exemplary embodiment the system 1100 may be used for treating biogas and wastewater produced by an anaerobic digester via nanobubbles and gas-hydrate formation. The exemplary system 1100 is not limited to use in the context of anaerobic digestion, however, and other uses are envisaged.

The operation of the system 1100 will now be described with regard to an exemplary method of treating wastewater from an anaerobic digester, however it is noted that wastewater is one example of a first medium and a gas such as a biogas is one example of a second medium. Moreover, the source of the first medium and/or the second medium need not be an anaerobic digester, as will be understood in consideration of (for example) the various embodiments described in the foregoing.

Wastewater may be introduced to the generator 101 via a first inlet 1105, while biogas may be introduced to the generator 101 via a second inlet 1110. The wastewater optionally may be directed through a sand filter 1115 before reaching the generator 101, so as to minimise the volume of particulate matter or other undesirable materials other than the wastewater itself reaching the generator 101. Once the biogas and/or the wastewater have been provided to the generator 101, the biogas purification process may be initiated. In the exemplary embodiment, the biogas purification process is the nanobubble generation process such as that according to FIG. 6. Advantageously, the biogas purification process such as the biogas purification process of FIG. 6 may be completed in a single pass—that is, up to ~98% purity methane may be obtained and iterations of the purification process may not be necessary as a consequence. In the exemplary embodiment, microbes may convert $H_2S$, precipitating sulphur; with iron addition, to $FeSO_4$. The $CH_4$, which has been purified from the $CO_2$ via formation of $CO_2$ nanobubbles, may be routed out of the generator 101 via a first outlet 1120 to a gas storage unit 1125. In the exemplary embodiment the gas storage unit 1125 comprises a multitude of gas storage vessels. Following biogas purification, the wastewater and the $CO_2$ nanobubbles may be released from the generator 101. In the exemplary embodiment, the $CO_2$ may be controllably released from its solvated nanobubble form in the generator 101 by the application of an acoustic or electromagnetic signal, as described in the foregoing. The wastewater and the $CO_2$ may be directed to a secondary treatment vessel 1130 via first outlet 1135. Alternatively to directing the wastewater to the generator 101, an outlet (not presented) may be provided at the generator 101 which is connected to a conduit which directs the wastewater to the secondary treatment vessel 1130. The outlet may be connected to the conduit via a tap or controlled release mechanism such as a valve mechanism (not presented).

It will be understood that whilst the present Figure illustrates three copies of the secondary treatment vessel 1130, this is presented for pictorial purposes only in elucidating a three stage process which takes place in the secondary treatment vessel 1130. This three stage process will now be described.

In the first stage, the wastewater and the $CO_2$ are loaded to the secondary treatment vessel 1130. In the exemplary embodiment, the wastewater and the $CO_2$ are loaded to the treatment vessel 1130 at room temperature.

In the second stage, the secondary treatment vessel 1130 is cooled to a temperature less than the loading temperature of the first stage. In the second stage, clathrate hydrates are formed from the $CO_2$ and the wastewater. The formation of clathrate hydrates significantly purifies the wastewater. Residual dirt which has been separated from the water may then be directed out of the secondary treatment vessel 1130, leaving $CO_2$ and clean water.

In the third stage, the temperature of the secondary treatment vessel 1130 may then be raised, facilitating melting the clathrate hydrates. Clean water may then be directed out of the secondary treatment vessel 1130 via a second outlet 1140. In one embodiment, the clean water may be directed to a water retention vessel (not presented) such as but not limited to a water storage tank or silo. The water retention vessel may be purposed for temporary or long-term storage of water. In another embodiment, the clean water may be directed to a public or private water supply. The $CO_2$ may be directed to a gas storage vessel of the gas storage unit 1125 via third outlet 1145.

Figure 12:
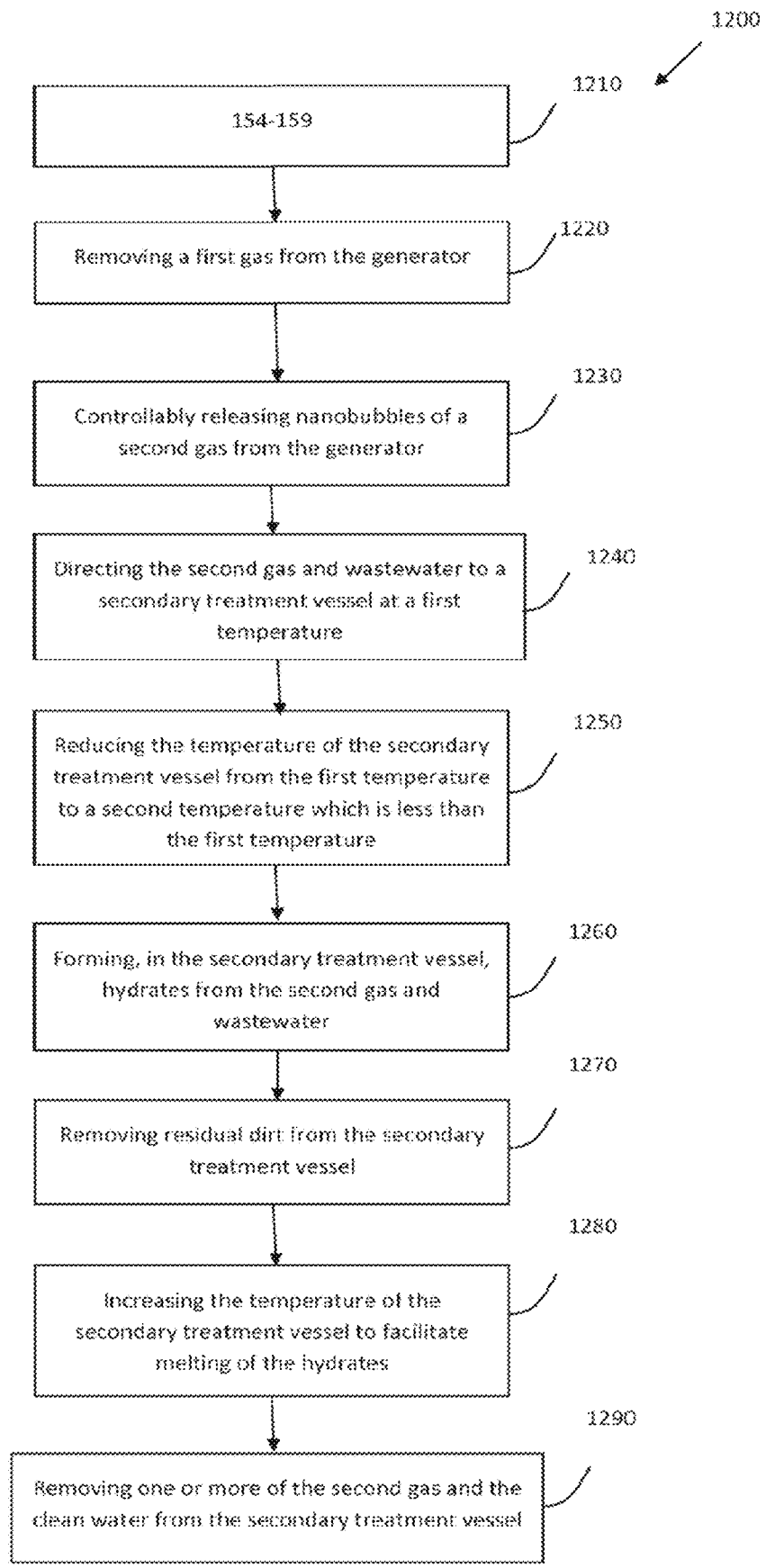
FIG. 12 is a flow diagram illustrating exemplary steps of a method for treating biogas and wastewater using the system of FIG. 11, according to an embodiment of the present teaching.

FIG. 12 is a flow diagram illustrating an exemplary method 1200 of treating a multi-component mixture using the exemplary system 1100 of FIG. 11. First, the steps of FIG. 6 are carried out; 1210. In one embodiment, the liquid provided to the generator 101 in step 1210 entirely comprises wastewater. In alternative embodiments, the liquid provided to the generator 101 in step 1210 in part comprises wastewater and in part comprises a further liquid other than the wastewater. In another embodiment, the liquid provided to the generator 101 does not comprise any wastewater, and the wastewater is provided directly to the secondary treatment vessel 1130 from the anaerobic digester or another source. Typically, the wastewater will have been received from an anaerobic digester, however it will be understood that other sources of wastewater such as but not limited to sewage are equally feasible. For example, wastewater to be purified using the system and/or method of FIGS. 11 and 12 may include, but is not limited to: sea-water, frack-water, reverse-osmosis wastewater, agricultural wastewater, slaughterhouse and tannery wastewater, mining wastewater, and wastewater from cement and construction. Further, the source of the gas need not necessarily be from an anaerobic digester—by way of example only, the gas may be sourced from landfill, mining, construction, industrial, vehicular or other settings. Indeed the anaerobic digester embodiment is provided by way of example only; the use of nanobubbles or nanodroplets of a guest species such as a gas together with a wastewater component to form hydrates and treat the wastewater may be applied to various wastewater treatment scenarios. Indeed, the integrated purification of a multi-component gas and wastewater stream is envisaged to be widely applicable beyond anaerobic digestion to various settings of differing scales from small-scale agricultural or domestic uses to large-scale industrial applications such as in chemical treatment or production plants. As previously discussed, the medium supplied to the generator 101 may be a mixture of two or more gases. In the exemplary embodiment the gas medium supplied to the generator 101 in step 1210 at least comprises methane and carbon dioxide. What is more, as described above, nanodroplets may also be formed using the generator 101, and as such nanodroplets may be used in the above process of FIG. 12 and in the system 1100 of FIG. 11. Gas components other than methane may include but are not limited to propane, ethane, butane, pentane, hexane etc. and isomers of the same such as isobutane where desired. In embodiments where the multi-component mixture involves plural liquids, hydrates may be formed comprising liquids and not necessarily gases.

The formation of nanobubbles (or nanodroplets or some combination) of the second gas substantially purifies the first gas. In the exemplary embodiment, the formation of nanobubbles of the second gas may purify the first gas to approximately 98%. Once purification of the first gas has been completed according to the exemplary steps subsisting in step 1210, the purified first gas may be removed 1220 from the generator 101. In the exemplary embodiment, the purified first gas may be directed to the gas storage unit 1125. In the exemplary embodiment, the first gas component is methane.

In the exemplary embodiment, the medium supplied 156 to the volume of the generator 101 is a multi-component gas. This multi-component gas may be separated according to the steps of FIG. 6 1210, and the purified first gas component optionally may be directed out of the volume of the generator 101. Subsequent to removal 1220 of the purified first gas, the second gas component of the medium (now in solvated nanobubble form due to step 1210) may be controllably released 1230 from the generator 101. A second medium, which in the exemplary embodiment is wastewater, may be directed to the secondary treatment vessel 1130 in addition to the second gas component of the medium. The wastewater may be directed from the generator 101 volume or directly from a source. The source of the wastewater may be the same as the source of the first medium or different. In the exemplary embodiment, the source of the wastewater and the first medium is an anaerobic digester. In the exemplary embodiment, the controllable release of the second gas component from its nanobubble form may be performed according to the previously described method of release wherein an acoustic or electromagnetic signal is applied to the generator 101. In the exemplary embodiment, the second gas component from which nanobubbles are formed may be carbon dioxide and the purified component which is directed out of the volume of the generator 101 may be methane.

Subsequent to step 1230, the nanobubbles of the second gas, and wastewater, may then be directed 1240 to the secondary treatment vessel 1130, which is held at a first temperature $T_1$. In the exemplary embodiment, the first temperature $T_1$ is room temperature, or in the approximate range $293 \leq T_1 (K) \leq 298$. It will be understood that temperature is given here in SI base units of Kelvin (K).

The temperature of the secondary treatment vessel 1130 may then be reduced 1250 to a temperature $T_2 < T_1$. In the exemplary embodiment, the temperature $T_2$ is in the approximate range of 273K to 283K. Subsequently, clathrate hydrates begin to form 1260 from the second gas and wastewater, substantially purifying the wastewater. Clathrate hydrates are non-stoichiometric crystalline inclusion compounds, wherein a hydrogen-bonded water host lattice encages small guest molecules in cavities. Hydrates have become very important for treatment of (heavily-polluted) water, owing to their ability to form stoichiometrically pure crystals with an introduced gas, separating from the residual sludge by flotation. For hydrate crystallisation to be effective, intimate contact between gas and water is needed. Clearly, the exploitation of the nano-phase (whether in bubble or droplet form, or some combination) will improve both the aqueous concentration, especially for liquid nano-droplets, and contact area. For instance, in studies so far with propane nano-droplets and ~4% wt (solids) wastewater, the hydrate-formation rate is about double that without the nano-phase in a pressure-vessel system, with other several-fold rate enhancements for $CO_2$ and methane. In Molecular Dynamics (MD) simulations of nano-droplets, the inventors have also witnessed substantially elevated hydrate-formation rates, owing to aqueous-phase guest super-saturation.

Residual dirt, now separated from the wastewater as a result of the gas-hydrate formation, is removed 1270 from the secondary treatment vessel 1130. In certain embodiments, the residual dirt may be relocated to a waste retention unit. The residual dirt may find subsequent use in industry or elsewhere, for example as feedstock.

Following the removal of the residual dirt from the secondary treatment vessel 1130, the temperature of the secondary treatment vessel 1130 may be increased 1280. In the exemplary embodiment, the temperature of the secondary treatment vessel 1130 is returned to room temperature, or in the approximate range $293 \leq T_1$ (K)$\leq 298$. By increasing the temperature with respect to $T_2$, melting of the clathrate hydrates may occur. One or both of the second gas and the clean water may then be removed 1290 from the secondary treatment vessel 1130.

The system and/or method of FIGS. 11 and 12 respectively may have a plurality of applications together or separately. Advantageously, a variety of small-scale applications exist which, in comparison to the state-of-the-art, are significantly more economically feasible. By way of example only, the system and/or method of FIGS. 11 and 12 respectively may be used in agricultural settings including small-scale agricultural settings such as a farm with a small number of livestock or late-cut silage/beat. In such embodiments, the method of purifying bio-methane or other gases according to the methods and systems described above may facilitate self-sufficient production of bio-methane or other gases to support home and dairying operations, transport (e.g. cars, tractors and the like), in addition to wastewater treatment.

Figure 13:
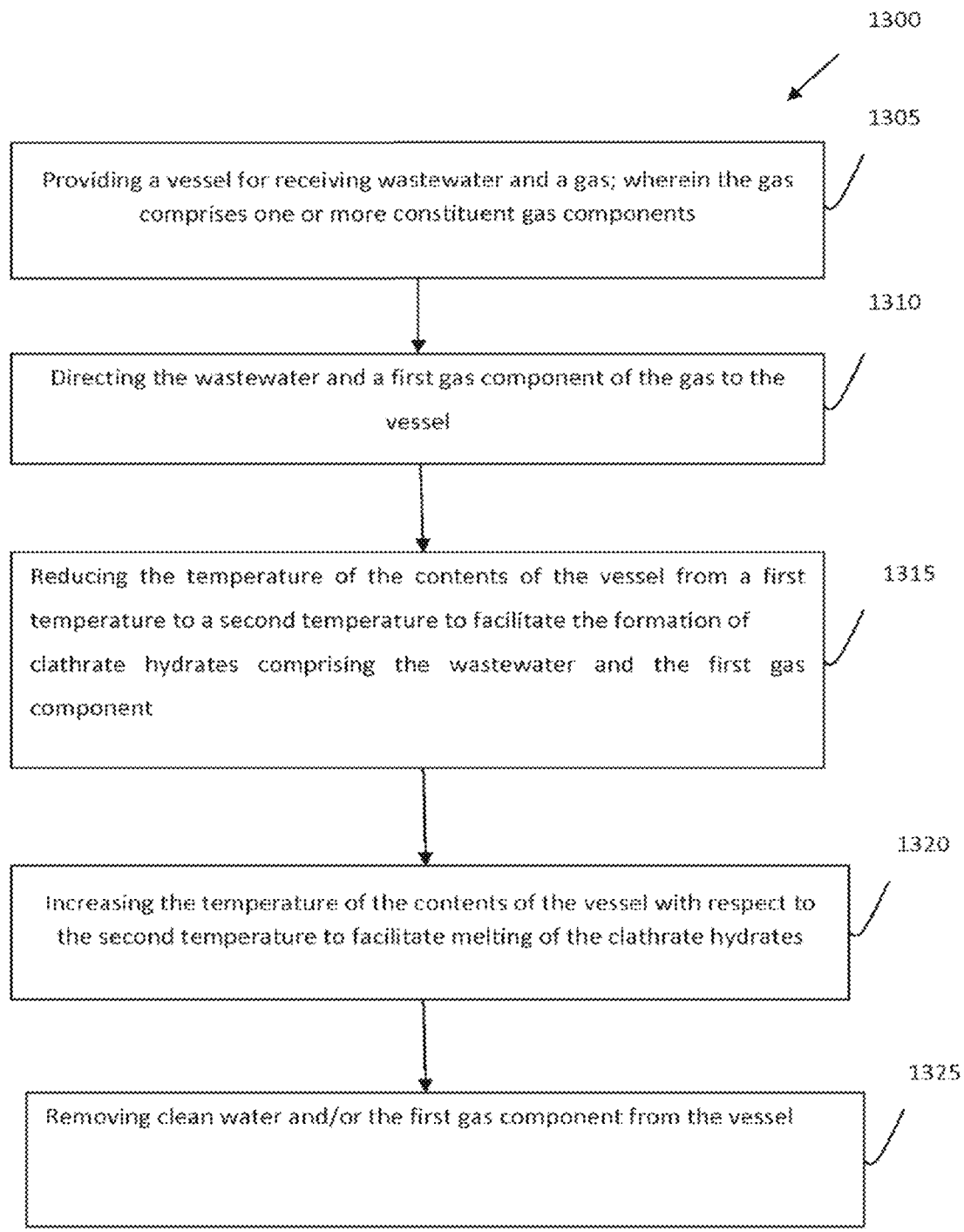
FIG. 13 is a flow diagram illustrating exemplary steps of a method for treating wastewater.

Referring to the flow chart 1300 of FIG. 13 which illustrates exemplary steps of a method of treating wastewater in accordance with the present teaching. In step 1305, a vessel for receiving wastewater and a gas is provided; wherein the gas comprises one or more constituent gas components. In step 1310, the wastewater and a first gas component of the gas is directed to the vessel. In step 1315, the temperature of the contents of the vessel is reduced from a first temperature to a second temperature to facilitate the formation of clathrate hydrates comprising the wastewater and the first gas component. In step 1320, the temperature of the contents of the vessel is increased with respect to the second temperature to facilitate melting of the clathrate hydrates. In step 1325, clean water and/or the first gas component is removed from the vessel.

Figure 14:
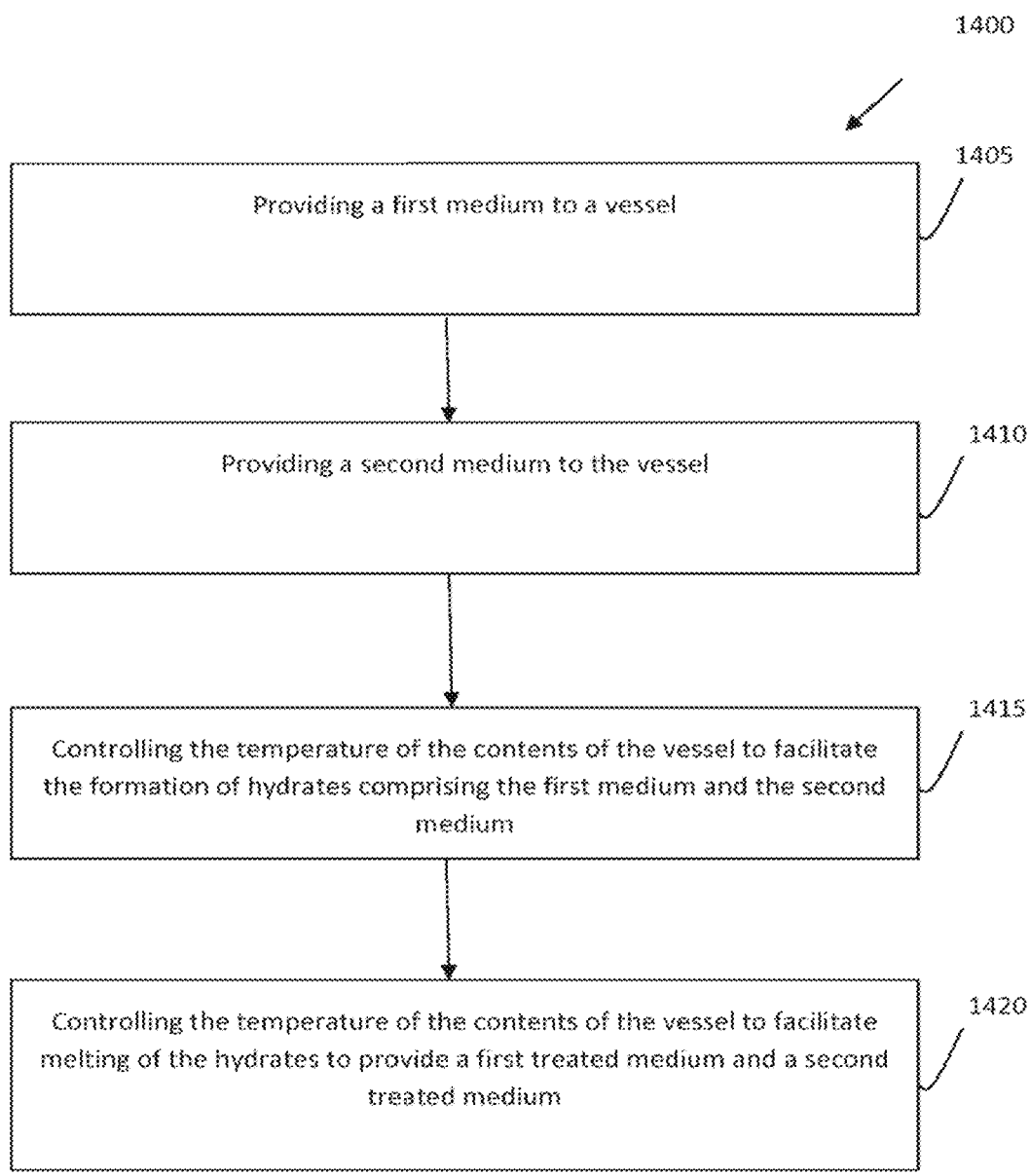
FIG. 14 is a flow diagram illustrating exemplary steps of a method for treating a multi-component mixture.

Referring to the flow chart 1400 of FIG. 14 which illustrates exemplary steps of a method of treating a multicomponent mixture. In step 1405, a first medium is provided to a vessel. In step 1410, a second medium is provided to the vessel. In step 1415, the temperature of the contents of the vessel is controlled to facilitate the formation of hydrates comprising the first medium and the second medium. In step 1420, the temperature of the contents of the vessel is controlled to facilitate melting of the hydrates to provide a first treated medium and a second treated medium.

It will be appreciated by the person of skill in the art that various modifications may be made to the above described embodiments without departing from the scope of the present invention. It will be understood by those skilled in the art that the operation of the system has been described with reference to particular values such as pressure, temperature, voltage, volumes which are provided by way of example only, it will be understood that alternative values may be used. For example, the values may change when the experimental setup is scaled or modified within the scope of the present disclosure. Moreover, it will be understood by those skilled in the art that the absence of use of additives and/or electrolysis in the exemplary embodiment is indeed by way of example only. In this way it will be understood that the teaching is to be limited only insofar as is deemed necessary in the light of the appended claims.

Similarly the words comprises/comprising when used in the specification are used to specify the presence of stated formations, integers, steps or components but do not preclude the presence or addition of one or more additional formations, integers, steps, components or groups thereof.

It will be understood that, whilst exemplary features of an apparatus for generating nanobubbles/nanodroplets and treating biogas and wastewater have been described, such an arrangement is not to be construed as limiting the invention to such features. The method for generating nanobubbles/nanodroplets and treating biogas and wastewater may be implemented in software, firmware, hardware, or a combination thereof. In one mode, the method is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. The steps of the method may be implemented by a server or computer in which the software modules reside or partially reside.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor(s) may be programmed to perform the functions of the method for controlling a generator of nanobubbles/nanodroplets and more broadly a system for treating biogas and wastewaters. The processor(s) is a hardware device for executing software, particularly software stored in memory. Processor(s) can be any custom made or commercially available processor, a primary processing unit (CPU), an auxiliary processor among several processors associated with a computer, a semiconductor based microprocessor (in the form of a microchip or chip set), a macro-processor, or generally any device for executing software instructions.

Memory is associated with processor(s) and can include any one or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s).

The software in memory may include one or more separate programs. The separate programs comprise ordered listings of executable instructions for implementing logical functions in order to implement the functions of the modules. In the example of heretofore described, the software in memory includes the one or more components of the method and is executable on a suitable operating system (O/S).

The present disclosure may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

When the method is implemented in software, it should be noted that such software can be stored on any computer readable medium for use by or in connection with any computer related system or method. In the context of this teaching, a computer readable medium is an electronic, magnetic, optical, or other physical device or means that can contain or store a computer program for use by or in connection with a computer related system or method. Such an arrangement can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. Any process descriptions or blocks in the Figures, should be understood as representing modules, segments, or portions of code which include one or more executable instructions for implementing specific logical functions or steps in the process, as would be understood by those having ordinary skill in the art.

The above detailed description of embodiments of the disclosure is not intended to be exhaustive nor to limit the disclosure to the exact form disclosed. While specific examples for the disclosure are described above for illustrative purposes, those skilled in the relevant art will recognize various modifications are possible within the scope of the disclosure. For example, while processes and blocks have been demonstrated in a particular order, different implementations may perform routines or employ systems having blocks, in an alternate order, and some processes or blocks may be deleted, supplemented, added, moved, separated, combined, and/or modified to provide different combinations or sub-combinations. Each of these processes or blocks may be implemented in a variety of alternate ways. Also, while processes or blocks are at times shown as being performed in sequence, these processes or blocks may instead be performed or implemented in parallel or may be performed at different times. The results of processes or blocks may be also held in a non-persistent store as a method of increasing throughput and reducing processing requirements.

The invention claimed is:

1. A method of treating wastewater, the method comprising the steps of:
providing a nanobubbles generator comprising a volume for receiving a liquid, providing a liquid in the volume, and distributing a gas within the liquid in the volume, the gas comprising one or more constituent gas components;
generating a static electric field using an electrode in the proximity of the volume of the nanobubbles generator for facilitating the generation of nanobubbles of a first gas component; wherein the electrode and the liquid are not in direct electrical contact to prevent electrolysis occurring within the volume of the nanobubble generator;
providing a vessel for receiving wastewater and the nanobubbles of the first gas component;
directing the wastewater and the nanobubbles of the first gas component to the vessel,
reducing the temperature of the contents of the vessel from a first temperature to a second temperature to facilitate the formation of clathrate hydrates comprising the wastewater and the first gas component;
increasing the temperature of the contents of the vessel with respect to the second temperature to facilitate melting of the clathrate hydrates; and
removing clean water and/or the first gas component from the vessel.

2. A method of treating wastewater according to claim 1, further comprising removing residual from the vessel.

3. A method of treating wastewater according to claim 1, further comprising removing from the nanobubbles generator a second gas component of the gas.

4. A method of treating wastewater according to claim 1, wherein the first gas component comprises carbon dioxide or carbon monoxide.

5. A method of treating wastewater according to claim 1, wherein a second gas component comprises methane.

6. A system for treating wastewater, the system comprising:
a nanobubbles generator comprising a volume for receiving therein a liquid and a gas, wherein the gas is distributed within the liquid within the volume, wherein the gas comprises one or more constituent gas components;
an electrode for applying a static electric field in the vicinity of the volume of the nanobubble generator to facilitate generation of nanobubbles of the first gas component, wherein the electrode and the first liquid are not in direct electrical contact to prevent electrolysis occurring within the volume of the nanobubbles generator;
a vessel for receiving wastewater and the first gas component;
means for directing the wastewater and the nanobubbles of the first gas component to the vessel;
a temperature control means configured:
for reducing the temperature of the contents of the vessel from a first temperature to a second temperature to facilitate the formation of clathrate hydrates comprising the wastewater and the first gas component; and
increasing the temperature of the vessel with respect to the second temperature to facilitate melting of the clathrate hydrates; and
means for removing clean water and/or the first gas component from the vessel.

7. A system for treating wastewater according to claim 6, further comprising a means for removing residual from the vessel.

8. A system for treating wastewater according to claim 6, further comprising means for removing from the nanobubbles generator a second gas component.

9. A system for treating a multi-component mixture, comprising:
a nanophase generator for generating nanobubbles or nanodroplets, the nanophase generator comprising a volume, the volume having a liquid therein and a first medium distributed within the liquid within the volume;

an electrode for generating an electric field in the proximity of the volume of the nanophase generator for facilitating the generation of the nanobubbles or the nanodroplets of the first medium; wherein the electrode and the liquid are not in direct electrical contact to prevent electrolysis occurring within the nanophase generator;

a vessel for receiving the first medium and a second medium, wherein the vessel is connected to the generator via a conduit;

a source for supplying the second medium to the vessel;

means for controllably releasing the nanobubbles or the nanodroplets from a volume of the nanophase generator to the vessel; and a temperature control means for controlling the temperature of the contents of the vessel, wherein the temperature control means is configured to control the temperature of the contents of the vessel to facilitate the formation of hydrates comprising the first medium and the second medium, and wherein the temperature control means is configured to control the temperature to facilitate melting of the hydrates to provide a first treated medium and a second treated medium.

10. A system for treating a multi-component mixture according to claim 9, further comprising at least one outlet for directing one or more of a first treated medium, a second treated medium or particulate matter out of the vessel.

11. A system for treating a multi-component mixture according to claim 9, wherein the source for providing the first medium is also the source for providing the second medium.

12. A system for treating a multi-component mixture according to claim 9, wherein the source of the gas is a flue.

13. A method for treating a multi-component mixture, comprising:

providing a nanophase generator for generating nanobubbles or nanodroplets, the nanophase generator comprising a volume;

providing a liquid in the volume and distributing a first medium within the liquid within the volume;

generating an electric field using an electrode in the proximity of the volume of the nanophase generator for facilitating the generation of nanobubbles or nanodroplets of the first medium; wherein the electrode and the liquid are not in direct electrical contact to prevent electrolysis occurring within the nanophase generator;

controllably releasing, from the nanophase generator to a vessel, the nanobubbles or the nanodroplets;

providing a second medium to the vessel;

controlling the temperature of the contents of the vessel to facilitate the formation of hydrates comprising the first medium and the second medium, and controlling the temperature of the contents of the vessel to facilitate melting of the hydrates to provide a first treated medium and a second treated medium.

14. A method of treating a multi-component mixture according to claim 13, wherein the hydrates formed are clathrate hydrates.

15. A method of treating a multi-component mixture according to claim 13, further comprising directing one or more of the first treated medium, the second treated medium, or particulate matter out of the vessel.

16. A method of treating a multi-component mixture according to claim 13, wherein the first medium comprises one or more of methane and carbon dioxide.

17. A method of treating a multi-component mixture according to claim 14, wherein the clathrate hydrates are formed from carbon dioxide molecules and wastewater.

18. A method of treating a multi-component mixture according to claim 13, wherein the source for providing the first medium is also the source for providing the second medium; or wherein the source for providing the first medium and the second medium is an anaerobic digester; or wherein the gas comprises $O_2$ or $N_2$; or wherein the second medium comprises petroleum; or wherein the gas comprises atmospheric air.

19. A method of treating a multi-component mixture according to claim 13; further comprising developing a nanophase for differential uptake of multi-component gas mixtures both in the gas phase and/or dissolved in an immiscible liquid phase.

20. A method according to claim 19; wherein the nanophase is applied in a distillation application.

21. A method according to claim 13; further comprising removing gas components from a flue-gas.

22. A method according to claim 21; further comprising hydrophobic or carbon nanotube filtering of a gas for nanobubbles creation.

23. A method according to claim 13; further comprising direct air capture (DAC).

24. A method according to claim 18; wherein excess $H_2$ is put into the anaerobic digester in the form of nanobubbles.

* * * * *